United States Patent
Bomzon et al.

(10) Patent No.: US 12,515,045 B2
(45) Date of Patent: Jan. 6, 2026

(54) TREATMENT PLANNING FOR TUMOR TREATING FIELDS

(71) Applicant: Novocure GmbH, Root (CH)

(72) Inventors: Zeev Bomzon, Haifa (IL); Hadas Sara Hershkovich, Haifa (IL); Noa Urman, Haifa (IL); Oren Ben Zion Bakalo, Haifa (IL); Gil Zigelman, Haifa (IL); Reuven Ruby Shamir, Haifa (IL)

(73) Assignee: Novocure GmbH, Baar (CH)

( * ) Notice: Subject to any disclaimer, the term of this patent is extended or adjusted under 35 U.S.C. 154(b) by 0 days.

(21) Appl. No.: 18/750,582

(22) Filed: Jun. 21, 2024

(65) Prior Publication Data
US 2025/0001168 A1    Jan. 2, 2025

Related U.S. Application Data

(60) Provisional application No. 63/524,470, filed on Jun. 30, 2023.

(51) Int. Cl.
*A61N 1/36*        (2006.01)
*A61N 1/02*        (2006.01)
(Continued)

(52) U.S. Cl.
CPC ......... *A61N 1/36002* (2017.08); *A61N 1/025* (2013.01); *A61N 1/0476* (2013.01);
(Continued)

(58) Field of Classification Search
CPC .. A61N 1/36002; A61N 1/025; A61N 1/0476; A61N 1/36031; A61N 1/36034; G16H 15/00; G16H 30/20; G16H 50/50
See application file for complete search history.

(56) References Cited

U.S. PATENT DOCUMENTS 6,553,152 B1   4/2003   Miller et al.
7,376,252 B2   5/2008   Gritzky et al.
(Continued)

FOREIGN PATENT DOCUMENTS

EP          3 731 179 A1    10/2020
WO    WO-2013/155358 A1    10/2013
(Continued)

OTHER PUBLICATIONS

Bevacqua et al., "A Method for Effective Permittivity and Conductivity Mapping of Biological Scenarios via Segmented Contrast Source Inversion," 2019.
(Continued)

*Primary Examiner* — Keith M Raymond
*Assistant Examiner* — Patrick M Mehl
(74) *Attorney, Agent, or Firm* — McCarter & English, LLP; Michael A. Sartori

(57) ABSTRACT

A method for generating a transducer layout for delivering tumor treating fields includes storing medical images of a subject, identifying one of the medical images as an anchor medical image, and registering computed tomography medical images with magnetic resonance imaging medical images. The method further includes segmenting abnormal tissue in the medical images from other tissue types and defining a region of interest (ROI) in the medical images. The method further includes creating a 3D model of the subject. The method further includes generating a plurality of transducer layouts for application of tumor treating fields to the subject, selecting at least two of the transducer layouts as recommended transducer layouts, presenting the recommended transducer layouts, receiving a user selection of at least one recommended transducer layout, and providing a report for the selected recommended transducer layout(s).

21 Claims, 24 Drawing Sheets

(51) Int. Cl.
*A61N 1/04* (2006.01)
*G16H 15/00* (2018.01)
*G16H 30/20* (2018.01)
*G16H 50/50* (2018.01)

(52) U.S. Cl.
CPC ..... *A61N 1/36031* (2017.08); *A61N 1/36034* (2017.08); *G16H 15/00* (2018.01); *G16H 30/20* (2018.01); *G16H 50/50* (2018.01)

(56) References Cited

U.S. PATENT DOCUMENTS

| | | | |
|---|---|---|---|
| 7,565,205 | B2 | 7/2009 | Palti |
| 8,019,133 | B2 | 9/2011 | Knoplioch et al. |
| 8,547,402 | B2 | 10/2013 | Kreeger et al. |
| 8,689,127 | B1 | 4/2014 | Ding et al. |
| 8,819,591 | B2 | 8/2014 | Wang et al. |
| 9,135,400 | B2 | 9/2015 | McIntyre et al. |
| 9,678,620 | B2 | 6/2017 | Wiemker et al. |
| 9,710,730 | B2 | 7/2017 | Konukoglu et al. |
| 9,848,799 | B2 | 12/2017 | Govari et al. |
| 10,096,382 | B2 | 10/2018 | Zhu et al. |
| 10,147,185 | B2 | 12/2018 | Riklin Raviv et al. |
| 10,188,851 | B2 | 1/2019 | Wenger et al. |
| 10,203,395 | B2 | 2/2019 | Foxall et al. |
| 10,286,216 | B2 | 5/2019 | Stone et al. |
| 10,740,933 | B2 | 8/2020 | Tripathi et al. |
| 10,966,688 | B2 | 4/2021 | Fialkov |
| 11,020,077 | B2 | 6/2021 | Wang et al. |
| 11,109,773 | B2 | 9/2021 | Urman et al. |
| 11,282,193 | B2 | 3/2022 | Harrison et al. |
| 11,417,071 | B1 | 8/2022 | Douglas et al. |
| 11,423,603 | B2 | 8/2022 | Sutton et al. |
| 11,620,789 | B2 | 4/2023 | Hershkovich et al. |
| 11,625,151 | B2 | 4/2023 | Gulaka et al. |
| 2005/0036668 | A1 | 2/2005 | McLennan et al. |
| 2005/0228250 | A1 | 10/2005 | Bitter et al. |
| 2006/0177133 | A1 | 8/2006 | Kee |
| 2009/0251465 | A1 | 10/2009 | Hassenpflug |
| 2013/0074005 | A1 | 3/2013 | Whitman et al. |
| 2016/0042537 | A1 | 2/2016 | Ng et al. |
| 2018/0160933 | A1 | 6/2018 | Urman et al. |
| 2020/0146586 | A1* | 5/2020 | Naveh .................. A61B 6/501 |
| 2020/0219261 | A1 | 7/2020 | Shamir et al. |
| 2020/0372705 | A1* | 11/2020 | Hershkovich .......... A61N 1/403 |
| 2021/0038314 | A1 | 2/2021 | Wibowo |
| 2021/0162228 | A1 | 6/2021 | Urman et al. |
| 2021/0187289 | A1* | 6/2021 | Munster ............. A61N 1/36031 |
| 2021/0201572 | A1 | 7/2021 | Bomzon |
| 2021/0299439 | A1 | 9/2021 | Shamir et al. |
| 2021/0327105 | A1 | 10/2021 | Morard et al. |
| 2022/0096853 | A1* | 3/2022 | Bakalo ............... A61N 1/36002 |
| 2022/0139531 | A1 | 5/2022 | Wang et al. |
| 2022/0151037 | A1* | 5/2022 | Taniguchi ............. H04N 23/73 |
| 2022/0245821 | A1 | 8/2022 | Ouzounis |
| 2022/0284585 | A1 | 9/2022 | Holtzman Gazit et al. |
| 2022/0292687 | A1 | 9/2022 | Yuzawa |
| 2022/0414883 | A1 | 12/2022 | Shinagawa et al. |
| 2023/0082049 | A1 | 3/2023 | Moreau |
| 2023/0143748 | A1 | 5/2023 | Butler et al. |
| 2023/0206548 | A1 | 6/2023 | Hershkovich et al. |

FOREIGN PATENT DOCUMENTS

| | | |
|---|---|---|
| WO | WO-2021/111186 A1 | 6/2021 |
| WO | WO-2022/185222 A1 | 9/2022 |

OTHER PUBLICATIONS

Chowdhury et al., "Concurrent segmentation of the prostate on MRI and CT via linked statistical shape models for radiotherapy planning," Apr. 3, 2012.

Davis et al., "LeGUI: A Fast and Accurate Graphical User Interface for Automated Detection and Anatomical Localization of Intracranial Electrodes," Dec. 9, 2021.

Paiement et al., "Integrated Segmentation and Interpolation of Sparse Data," 2013.

Iredale, et al., "Planning system for the optimization of electric field delivery using implanted electrodes for brain tumor control," Sep. 1, 2022.

Cates, et al., "GIST: An Interactive, GPU-Based Level Set Segmentation Tool for 3D Medical Images," Feb. 27, 2004.

Rivest-Henault et al., "Robust inverse-consistent affine CT-MR registration in MRI-assisted and MRI-alone prostate radiation therapy," Apr. 24, 2015.

Timmons et al., "End-to-end workflow for finite element analysis of tumor treating fields in glioblastomas," Oct. 11, 2017.

Correlation of Tumor Treating Fields Dosimetry to Survival Outcomes in Newly Diagnosed Glioblastoma: A Large-Scale Numerical Simulation-Based Analysis of Data from the Phase 3 EF-14 Randomized Trial by Ballo MT et al., Int J Radiat Oncol Biol Phys. 2019;104(5):1106-1113.

Wenger et al., "A Review on Tumor-Treating Fields (TTFIELDS): Clinical Implications Inferred from Computational Modeling," IEEE Reviews in Biomedical Engineering, vol. 11, Feb. 13, 2018, pp. 195-207.

Urman et al., "Investigating the Connection Between Tumor-Treating Fields Distribution in the Brain and Glioblastoma Patient Outcomes. A Simulation-Based Study Utilizing a Novel Model Creating Technique: Computational Homan Modeling at EMBC 2018", pp. 139-154.

M. Joliot and B.M. Mazoyer, "Three-dimensional segmentation and interpolation of magnetic resonance brain images," in IEEE Transactions on Medical Imaging, vol. 12, No. 2, pp. 269-277, Jun. 1993, doi: 10.1109/42.232255. (Year: 1993). [Cited in OA in U.S. Appl. No. 18/758,442, dated Sep. 29, 2025.].

* cited by examiner

TREATMENT PLANNING FOR TUMOR TREATING FIELDS

CROSS-REFERENCE TO RELATED APPLICATIONS

This application claims priority to U.S. Provisional Application No. 63/524,470, filed Jun. 30, 2023, which is incorporated herein by reference in its entirety. This application is related to U.S. Provisional Application No. 63/524,387, filed Jun. 30, 2023, which is incorporated herein by reference in its entirety.

BACKGROUND

Tumor treating fields (TTFields) are low intensity alternating electric fields within the intermediate frequency range (for example, 50 kHz to 1 MHz), which may be used to treat tumors as described in U.S. Pat. No. 7,565,205. TTFields are induced non-invasively into the region of interest by transducers placed on the patient's body and applying AC voltages between the transducers. Conventionally, a first pair of transducers and a second pair of transducers are placed on the subject's body. AC voltage is applied between the first pair of transducers for a first interval of time to generate an electric field with field lines generally running in the front-back direction. Then, AC voltage is applied at the same frequency between the second pair of transducers for a second interval of time to generate an electric field with field lines generally running in the right-left direction. The system then repeats this two-step sequence throughout the treatment.

BRIEF DESCRIPTION OF THE DRAWINGS

FIGS. 2-18 depict example user interfaces of a computer-based application for treatment planning for TTFields according to one or more embodiments described herein.

FIG. 19 depicts an example treatment report for a treatment performed using TTFields according to one or more embodiments described herein.

DESCRIPTION OF EMBODIMENTS

Figure 1A:
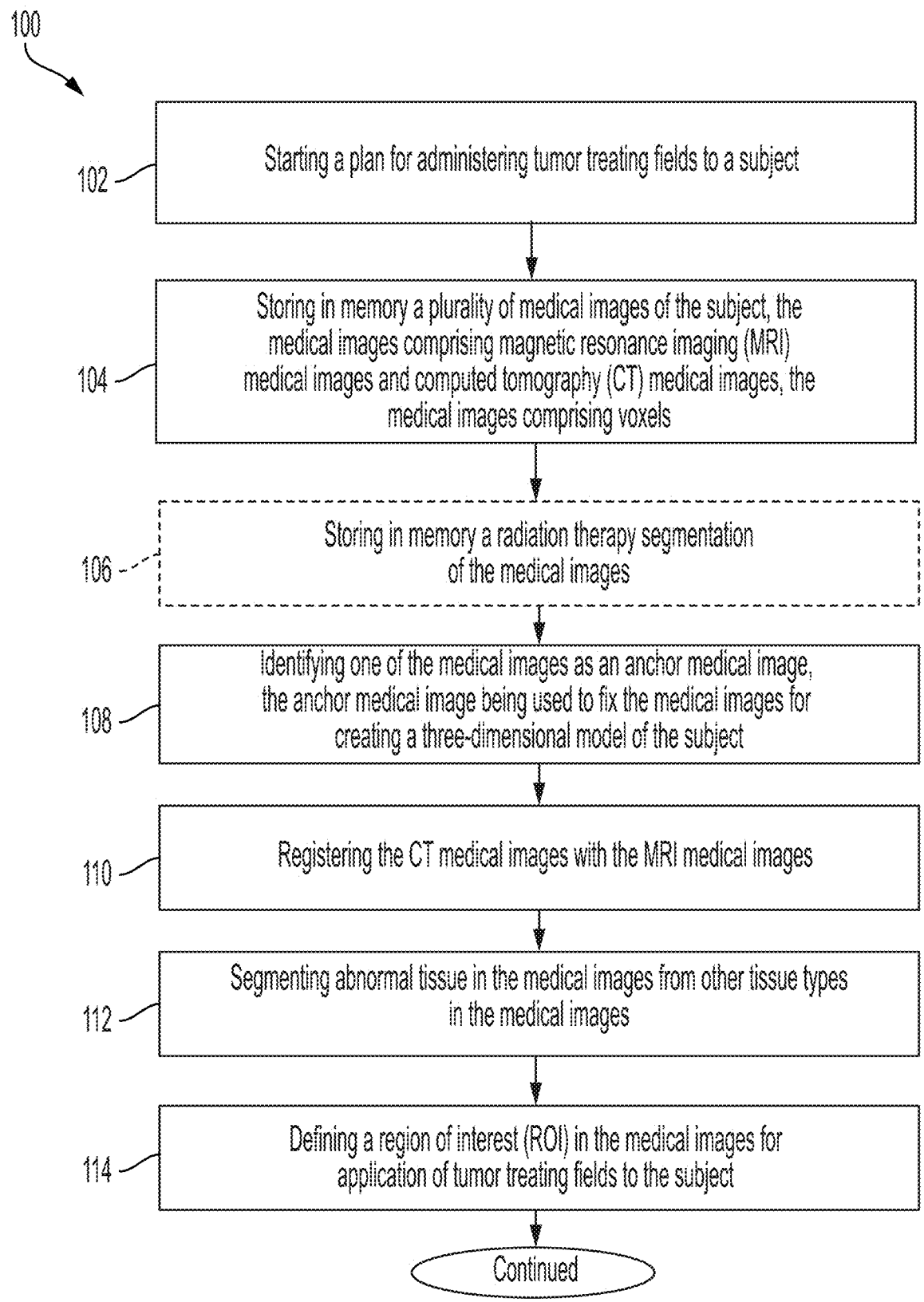
FIGS. 1A and 1B depict an example method for treatment planning for TTFields according to one or more embodiments described herein.

This application describes exemplary techniques for treatment planning for administering TTFields to a subject.

In general, one or more pairs of transducers are positioned on the subject's body and used to alternately apply TTFields to the subject's body. Generally, it is preferred that there are at least two pairs of transducers that are arranged to target a specific location or structure (e.g., a tumor) within the subject. Accordingly, proper placement of transducers is useful for treating the subject. Conventional treatment planning uses a series of measurements taken from a subject's magnetic resonance imaging (MRI) scans to measure aspects of the subject (e.g., the subject's head size, a location of the tumor, a size of the tumor, and/or the like including combinations and/or multiples thereof). Using these measurements, a customized layout for the transducers is generated. Generally, the layout does not include dose or dose distribution information, and generally the measurements generate a single layout.

The inventors have now recognized that a need exists for treatment planning capable of providing multiple possible layouts for applying TTfields to a subject.

Embodiments described herein provide for treatment planning for TTFields based on medical images, such as MRI medical images and/or computed tomography (CT) medical images. Abnormal tissues can be identified in the medical images and then segmented, and a region of interest can be defined for application of TTFields to the subject. A three-dimensional (3D) model can then be created using, for example, the medical images and tissue types in the medical images. The 3D model is then used to create multiple transducer layouts, two or more of which can be selected and presented to the subject for selection and implementation. The user can then selectively implement the two or more transducer layouts at different times.

The embodiments described herein further provide a practical application to generating transducer layouts based on medical images for the user. By using the medical images, such as MRI medical images and CT medical images, the subject's tissue conductivity is considered when generating transducer layouts for treating the subject. Moreover, the multiple generated layouts provide for selecting layouts based on dose distributions to maximize TTFields dose in tumors and areas at heighten risk for progression. This leads to improved subject response to treatment. Further, the multiple layouts can be used selectively, such that a subject can use a first layout for a first period of time and then a second layout for a second period of time. Using the multiple layouts can provide the subject with options regarding positioning of the transducers, thereby improving the comfort to the user and improving the effectiveness of the treatment. For example, a subject may be able to implement a layout that is more comfortable in certain situations while maintaining adequate dosage to treat the subject. Further, the multiple layouts can target a tumor or other structure of the subject from different arrangements, which may lead to better coverage. These and other technical improvements may be realized using the one or more embodiments described herein.

Figure 1B:
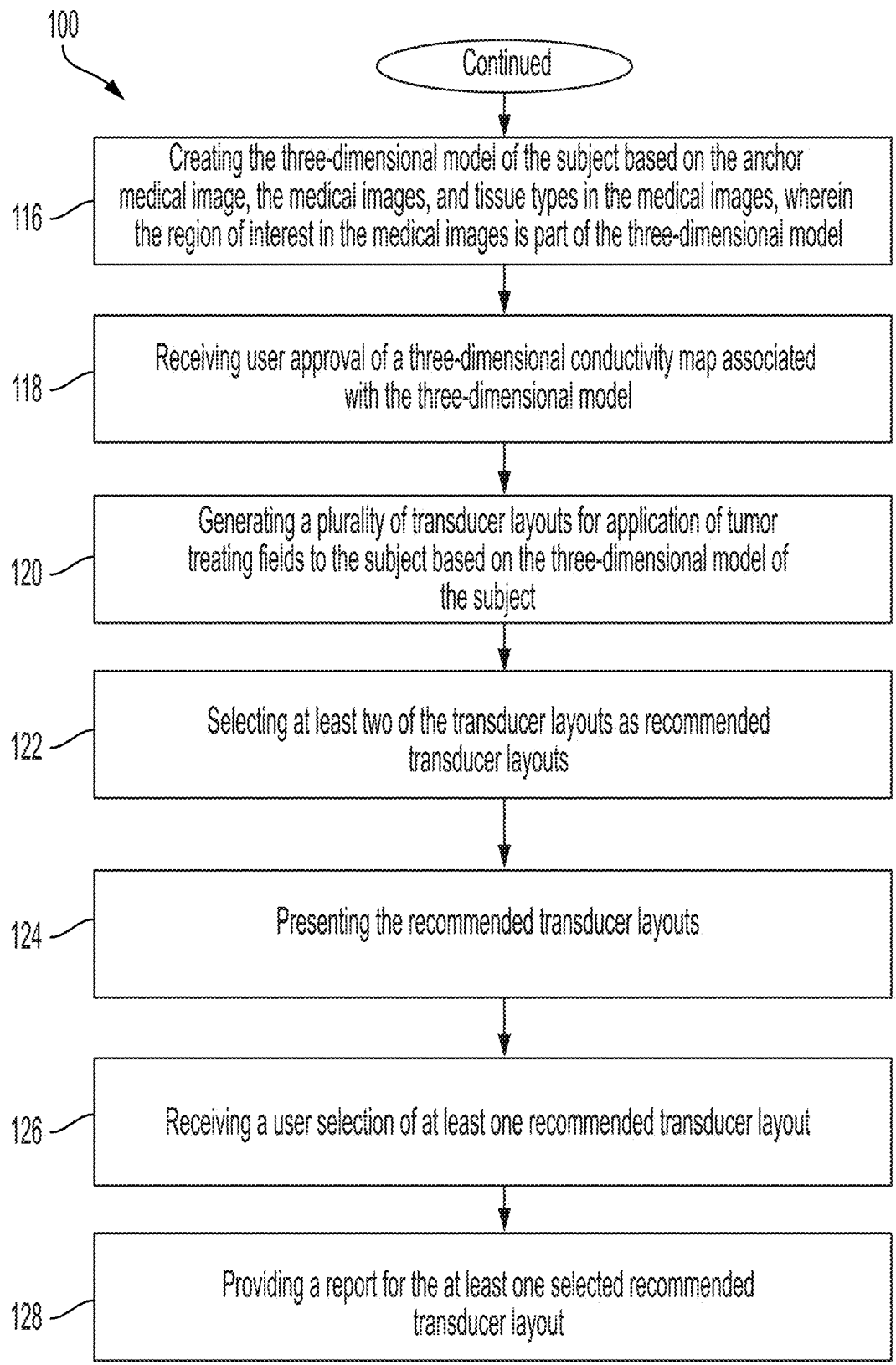

FIGS. 1A and 1B depict an example method 100 for treatment planning for TTFields according to one or more embodiments described herein. The method 100 can be implemented by any suitable system or apparatus, such the systems of FIGS. 21-23 and/or the apparatus of FIG. 25. The method 100 is now described with reference to the example user interfaces of a computer-based application for treatment planning for TTFields as shown in FIGS. 2-18; however, the method 100 is not so limited. While an order of operations is indicated in FIGS. 1A and 1B for illustrative purposes, the timing and ordering of such operations may vary where appropriate without negating the purpose and advantages of the examples set forth in detail throughout the remainder of this disclosure.

Figure 2:
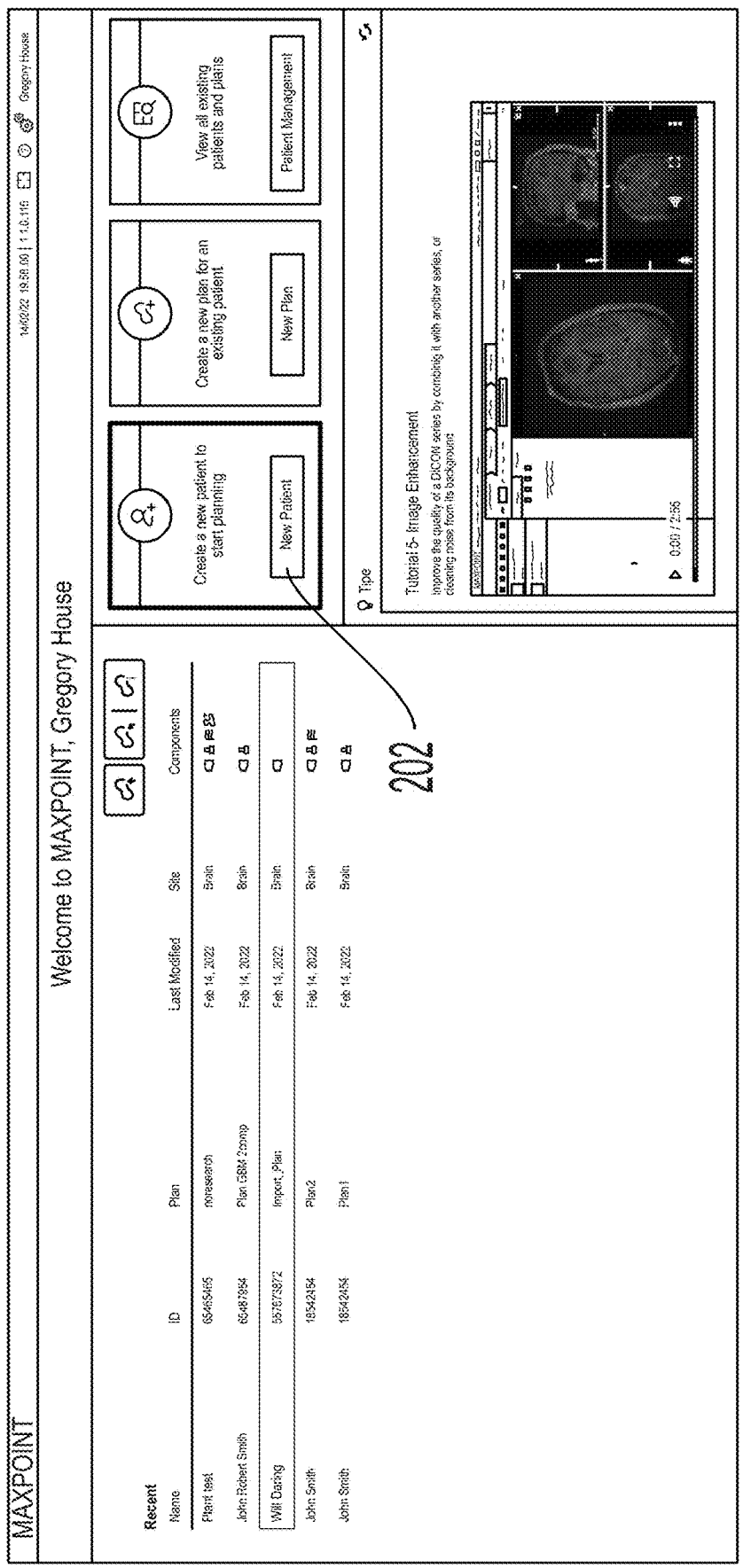
Figure 3:
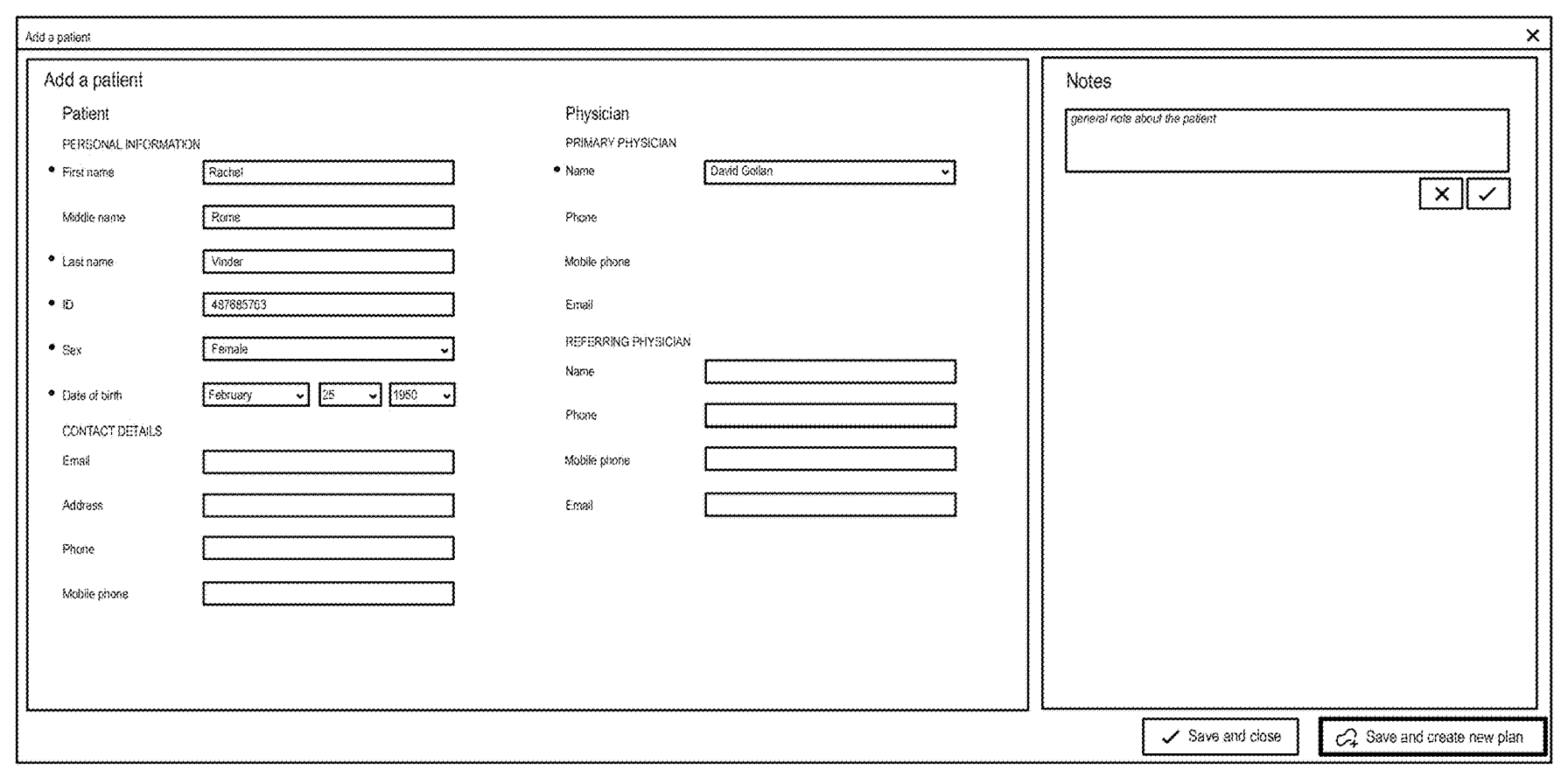

At block 102, the method 100 starts a plan for administering TTFields to a subject (e.g., a patient). For example, as shown in FIG. 2, a new patient can be added using the new patient button 202. As shown in FIG. 3, information for the new patient, such as patient information, contact details, physician information, notes, and/or the like including combinations and/or multiples thereof can be added and associated with the new patient. The information for the new patient may be stored in memory (e.g., the databases 2220 and/or the shared storage 2222 of FIG. 22, the memory 2326 of FIG. 23, the memory 2503 of FIG. 25, and/or the like including combinations and/or multiples thereof).

Figure 4:
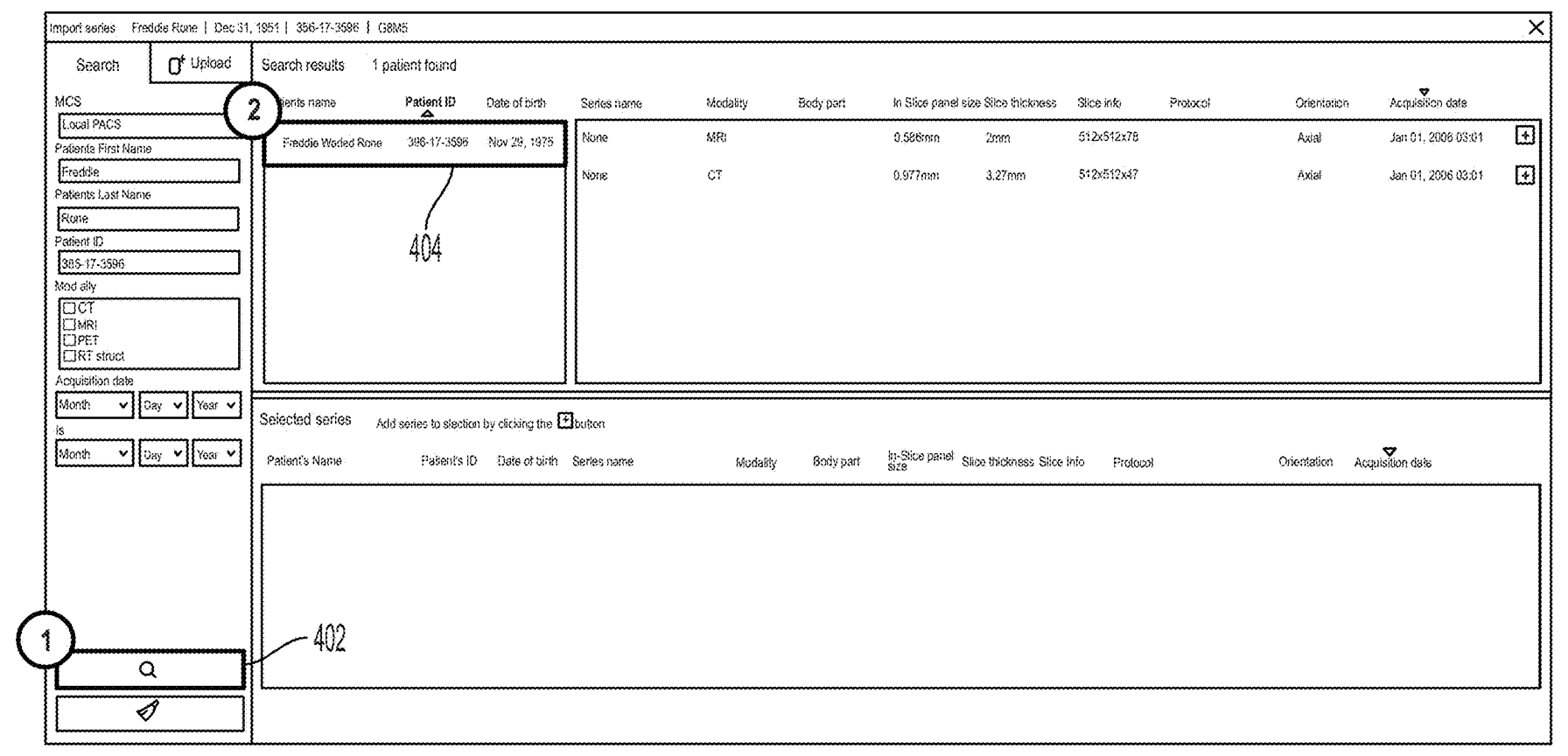
Figure 5:
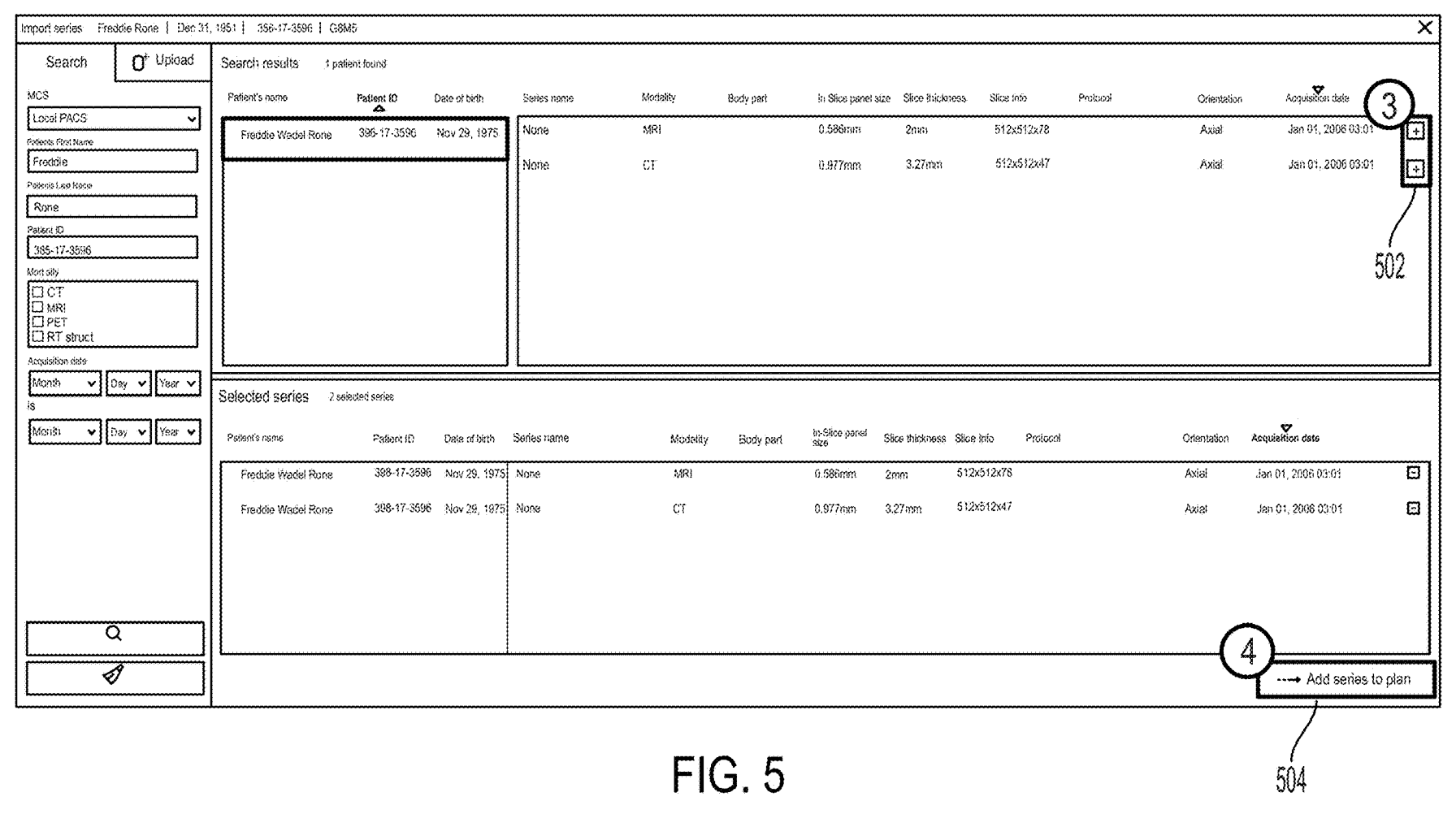

At block 104, the method 100 stores in the memory a plurality of medical images of the subject. The medical images can include MRI medical images and/or CT medical images. The medical images (e.g., the MRI medical images and/or the CT medical images) can include voxels. The medical images for a subject can be accessed by searching the memory. For example, as shown in FIG. 4, a search can be performed by patient name at search box 402, or a search for multiple patients can be performed by leaving the search box 402 blank. The results are shown in results box 404. As shown in FIG. 5, the medical images for the subject can be added using the + button 502. For example, the + button 502 can be used to load the desired medical images, and then the add series to plan button 504 can be selected to confirm the adding of the medical images.

Optionally, at block 106, the method 100 stores in the memory a radiation therapy segmentation of the medical images. For example, a radiologist can prescribe a radiation treatment for the patient, and the radiation treatment can be stored in the memory. According to one or more embodiments described herein, the segmenting of the abnormal tissue described herein with reference to block 112 can be performed based on the radiation therapy segmentation, thereby saving computational time.

Figure 6:
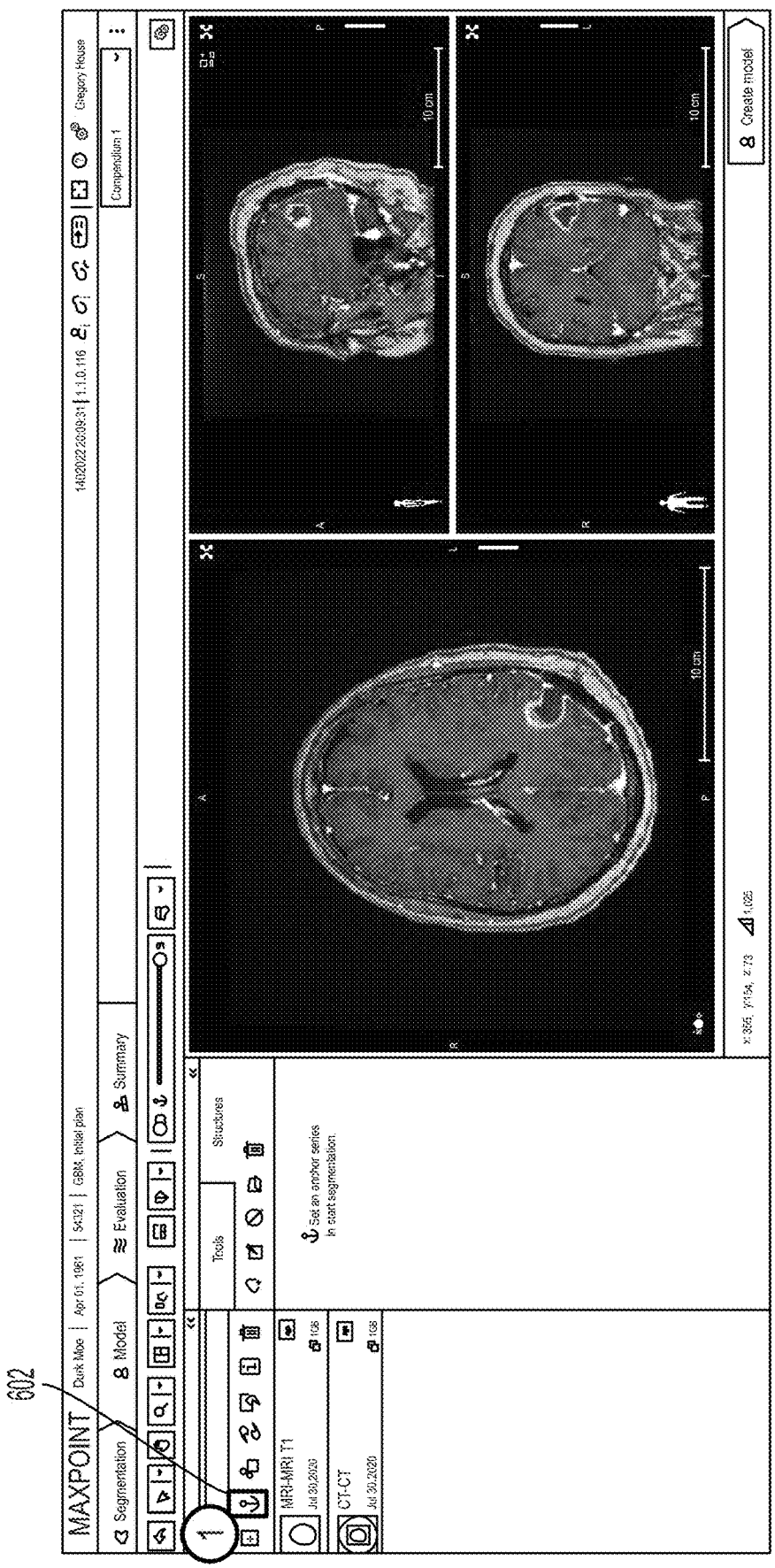

At block 108, the method 100 includes identifying one or more of the medical images as an anchor medical image. The anchor medical image is used to affix the medical images for creating a three-dimensional (3D) model of the subject. The anchor medical image may be selected from, for example, MRI medical images and/or CT medical images of the subject. For example, as shown in FIG. 6, an anchor button 602 can be selected to set the anchor medical image. In some cases, the medical images can be reviewed before the anchor medical image is set. For example, FIG. 6 shows an MRI series, which can be reviewed and/or set as the anchor medical image. According to one or more embodiments described herein, an MRI with a relatively high resolution (e.g., a slice thickness of 3 mm or less) T1+gad series may be set as the anchor medical image. As another example, the anchor can be an axial high resolution MRI T1 with contrast.

At block 110, the method 100 includes registering the CT medical images of the subject (if available) with the MRI medical images of the subject. By registering the CT medical images with the MRI medical images, the 3D model of the subject may be generated based on the MRI medical images and the CT medical images, and such a 3D model may be more accurate and/or more detailed than a 3D model generated based on only MRI medical images. Registering the CT medical images and the MRI medical images involves aligning the images relative to one another. According to one or more embodiments described herein, after the CT medical images are registered with the MRI medical images, the CT medical images are aligned and linked with the MRI medical images. According to one or more embodiments described herein, registering the CT medical images with the MRI medical images includes aligning and linking the CT medical images and the MRI medical images. According to one or more embodiments described herein, registering the CT medical images with the MRI medical images is performed automatically upon receiving a user request. According to one or more embodiments, images can be automatically registered, manually registered, and/or a combination of automatically and manually registered.

Figure 7:
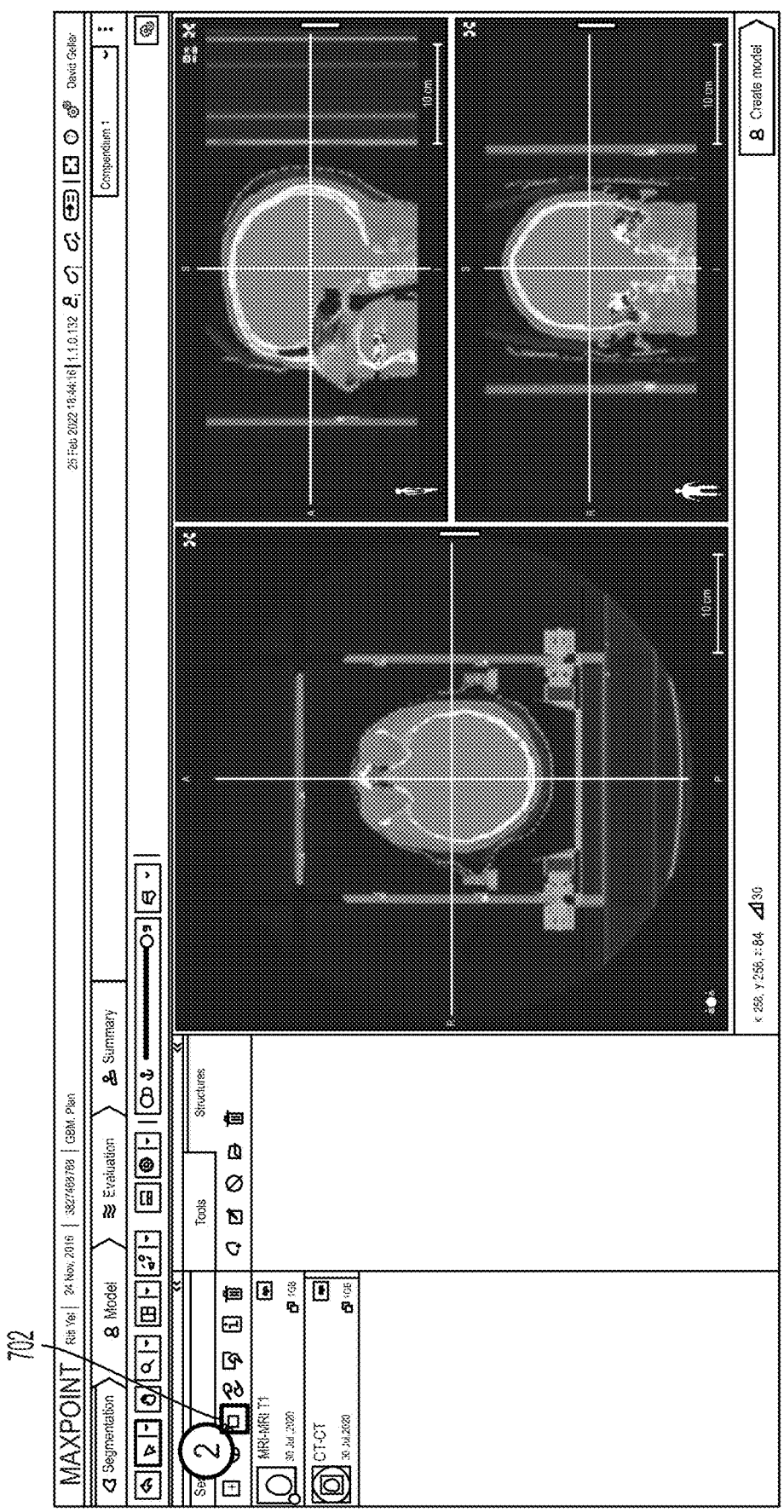
Figure 8:
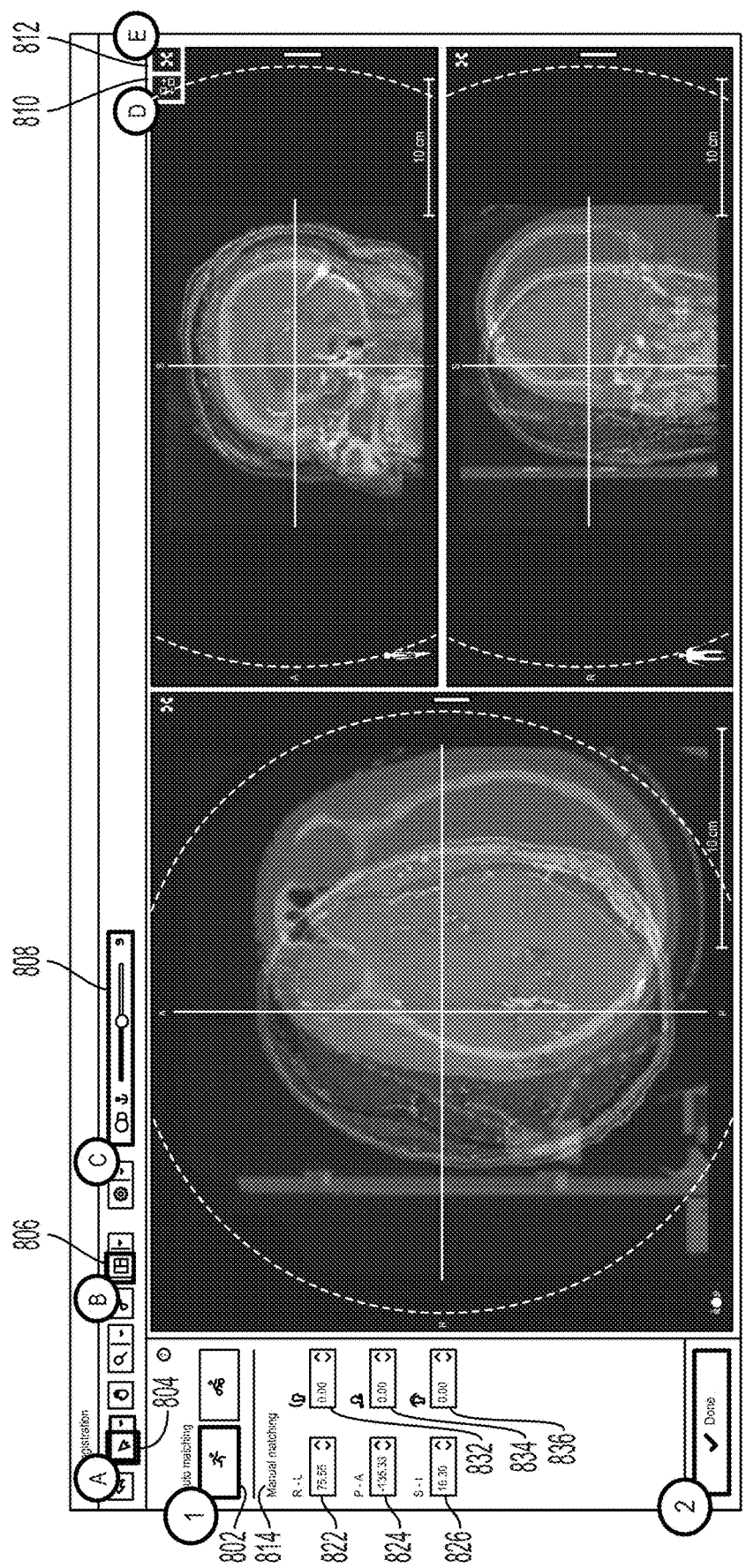

For example, as shown in FIG. 7, an available CT medical image of the subject can be selected and registered, using the registration button 702, to the MRI medical images. For example, as shown in FIG. 8, an auto matching run button 802 can be selected to initiate automatic registering. The auto matching, as shown in FIG. 8, can provide functionality, for example, to show or hide multi-planar reconstruction (MPR) (button 804), to select a layout (button 806), to adjust fusion opacity (slider 808), to switch views (button 810), and to enter/exit full screen mode (button 812). In addition to or instead of automatic registering via selecting the auto matching run button 802, manual registering may be performed using user-selectable alignment options in the manual matching area 814. The user-selectable alignment options for manually registering two medical images may include, for example, one or more of: move between right and left (R-L input field 822), move between posterior and anterior (P-A input field 824), move between superior and inferior (S-I input field 826), rotate on x-axis (input field 832), rotate on y-axis (input field 834), and rotate on z-axis (input field 836).

Figure 9:
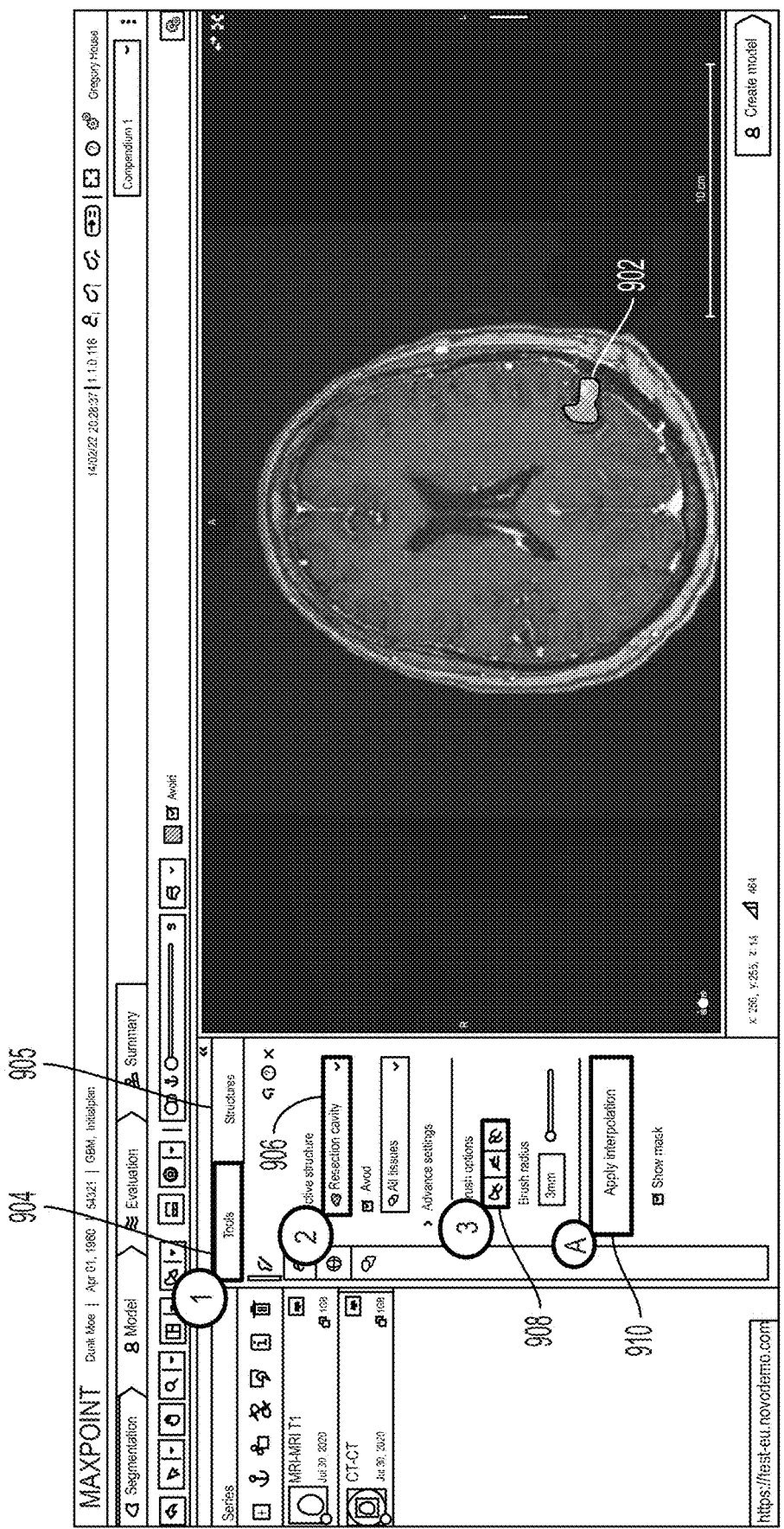
Figure 10:
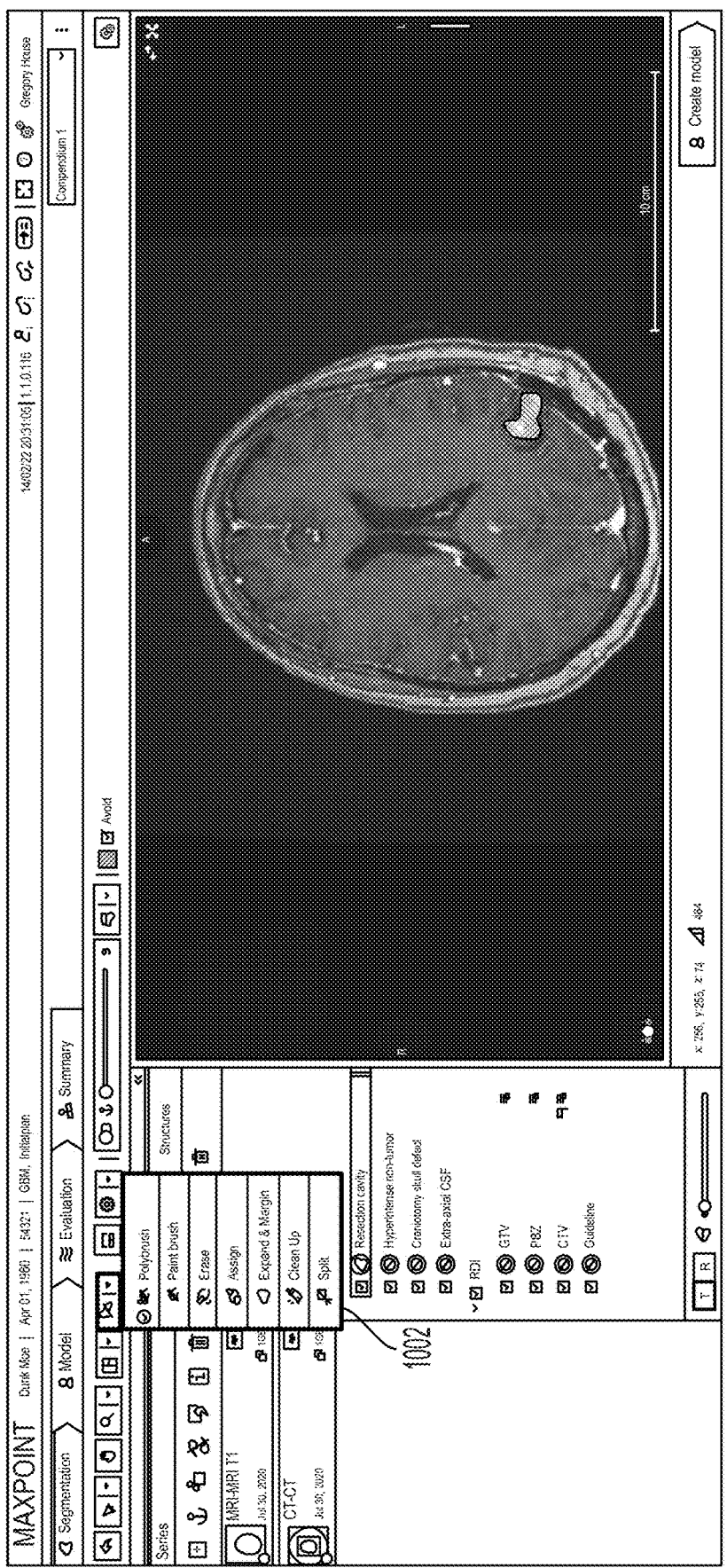

At block 112, the method 100 includes segmenting abnormal tissues in the medical images from other tissue types in the medical images. The abnormal tissue can be any undesirable type of tissue, such as a tumor, necrotic tissue, a prior surgical area (e.g., a resection cavity), and/or the like including combinations and/or multiples thereof. According to one or more embodiments, the medical images may be manually segmented, automatically segmented, and/or a combination of manually and automatically segmented. According to one or more embodiments described herein, segmenting abnormal tissue in the medical images may be based on user input identifying abnormal tissue in the medical images. For example, as shown in FIG. 9, an abnormal tissue region 902 is indicated. To segment one or more abnormal tissues, such as the abnormal tissue region 902, a user can select a tools tab 904 to begin contouring structures. Next, the user can select an active structure via dropdown 906 to identify a type of structure to contour (e.g., a resection cavity). As an option, the user may also select an active structure for segmenting by selecting the structures tab 905. In the tools tab 904, the the user can then select a brush tool button 908 (or any other suitable tool) to perform the segmenting. According to one or more embodiments described herein, an interpolation tool 910 can be used to expedite the segmenting. For example, a structure can be segmented in a first slice of the medical image, one or more subsequent slices of the medical image can be skipped, and then the structure can be segmented again on a next slice following the skipped slices. The interpolation tool 910 can then be used to apply the segmenting for the skipped slices, where the interpolation segmenting is performed based on the segmenting performed on the slices adjacent to the skipped slices. As shown in FIG. 10, a drop down menu 1002 can be used to provide a user with a set of tools to select without toggling to the tools tab 904. The tools in the drop down menu 1002 can be used for segmenting abnormal tissues. For example, a polybrush or paint brush can be used to outline an abnormal tissue region, such as the abnormal tissue region 902. Other tools in the drop down menu 1002 can include an erase tool, an assign tool, an expand and margin tool, a clean up tool, and a split tool.

Figure 11:
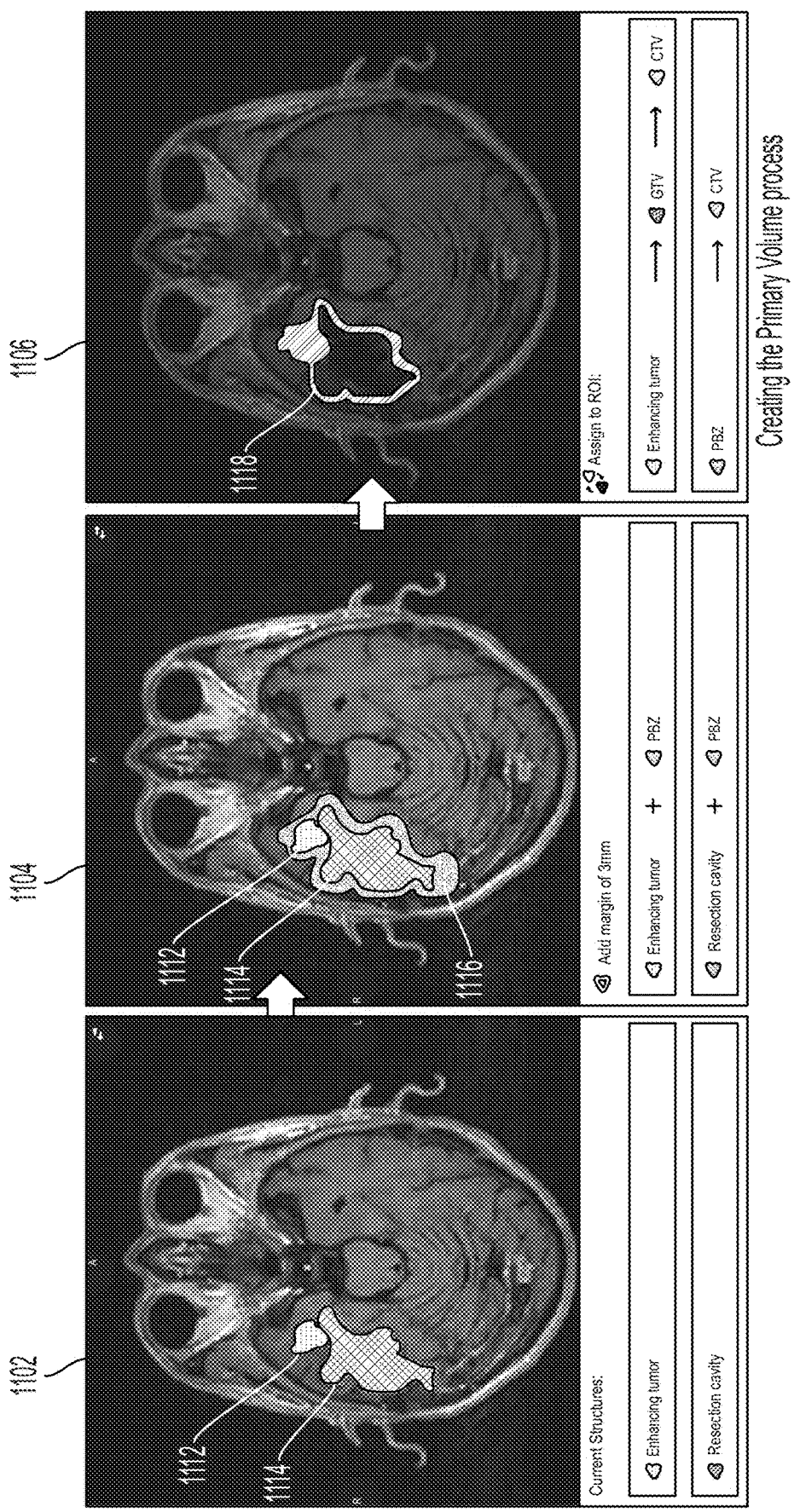
Figure 12:
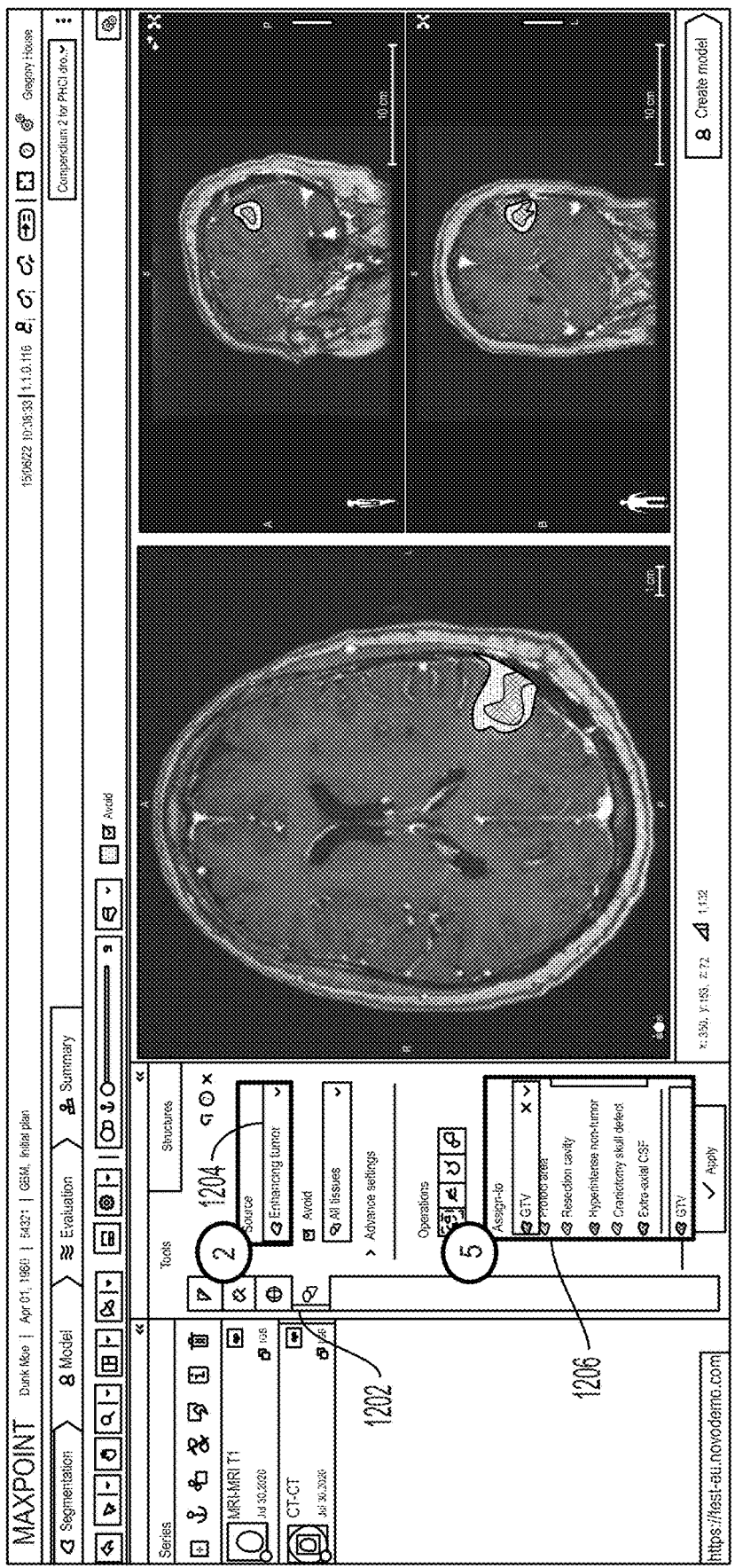
Figure 13:
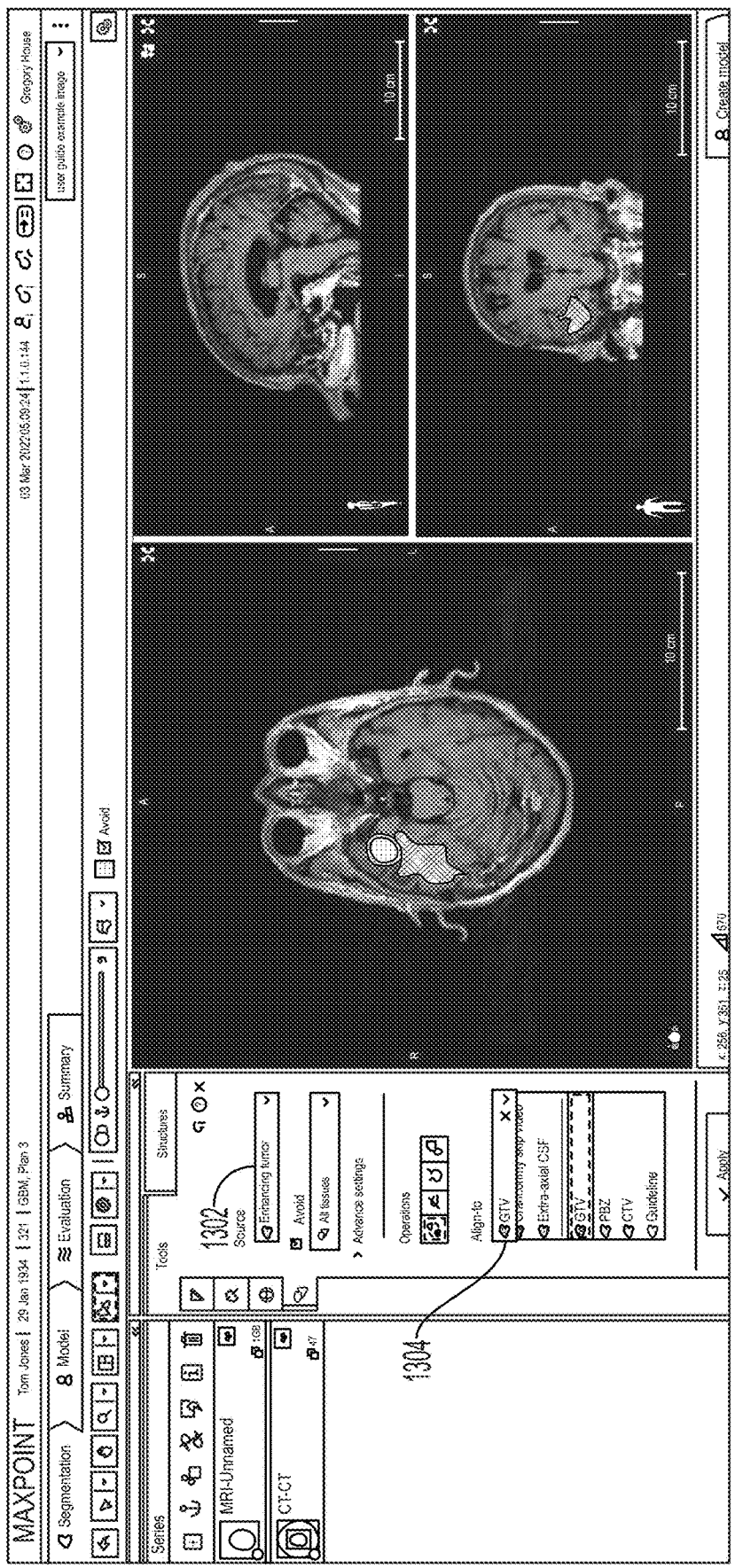
Figure 14A:
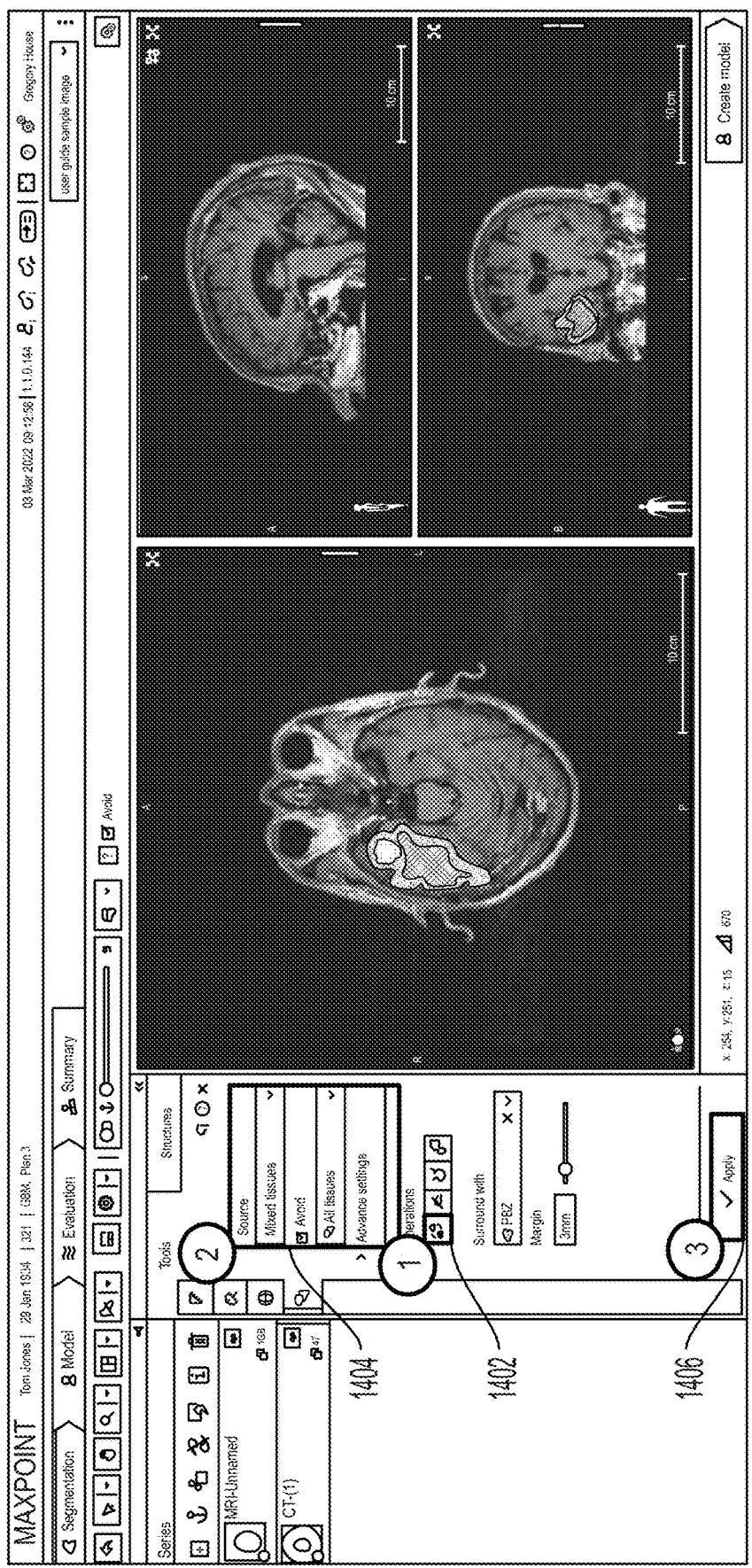
Figure 14B:
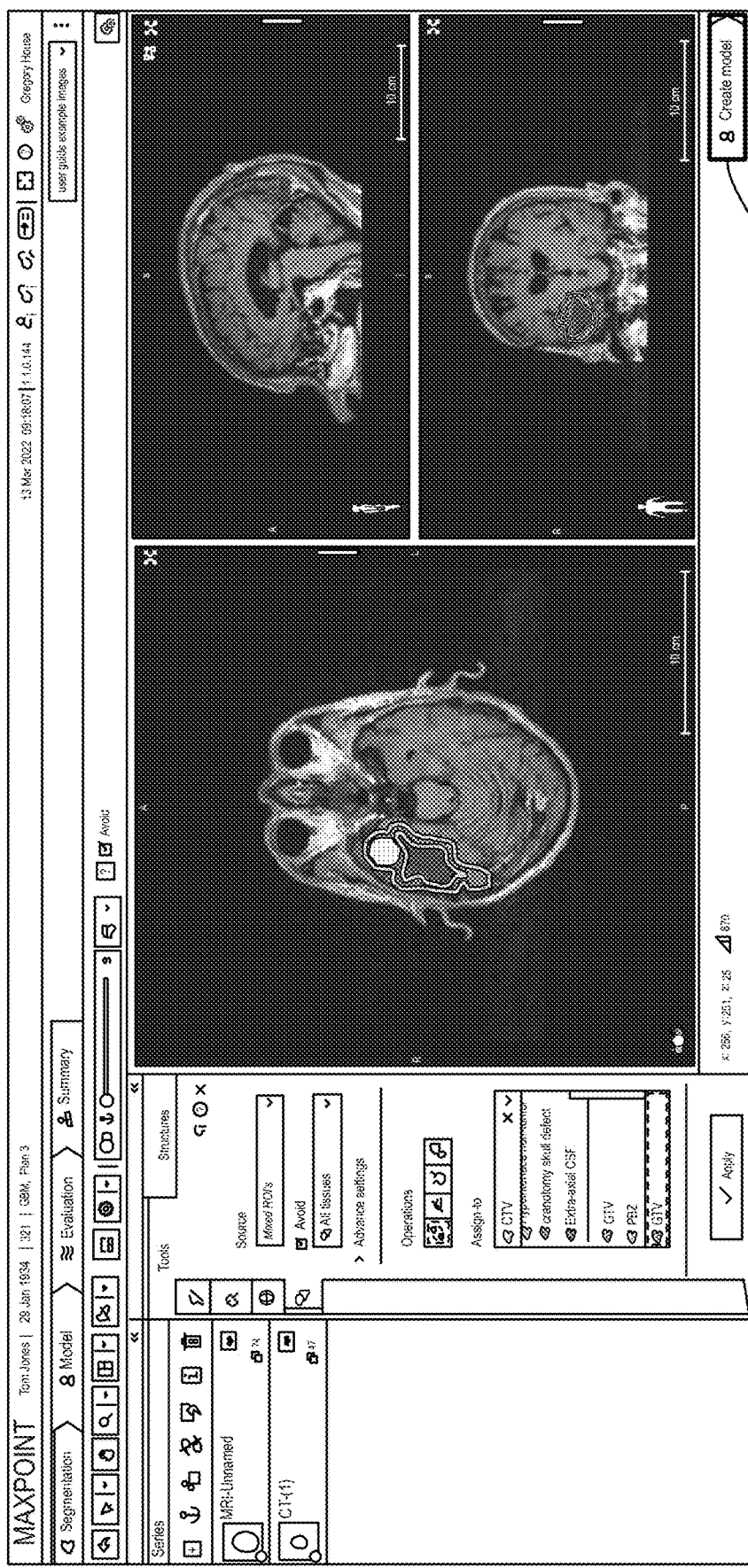

At block 114, the method 100 includes defining a region of interest (ROI) in the medical images for application of TTFields to the subject. The ROI defines where the TTFields are to focus. The ROI may be a continuous region or a discontinuous region (e.g., multiple disconnected regions). According to one or more embodiments described herein, as shown in FIG. 11, volumes can be assigned to the regions of interest, such as by using the approach described in "Correlation of Tumor Treating Fields Dosimetry to Survival Outcomes in Newly Diagnosed Glioblastoma: A Large-Scale Numerical Simulation-Based Analysis of Data from the Phase 3 EF-14 Randomized Trial" by Ballo M T et al., Int J Radiat Oncol Biol Phys. 2019; 104(5):1106-1113. In this example, as shown in image 1102, current structures include an enhancing tumor 1112 and a resection cavity 1114. Image 1104 shows that a proximal boundary zone 1116 (PBZ) (e.g., a margin of 3 mm) can be added to the enhancing tumor 1112 and the resection cavity 1114. Image 1106 assigns the region of interest to the enhancing tumor 1112 and the PBZ 1116 as shown to define the region of interest 1108. The PBZ can be created around the enhancing tumor and resection cavity as shown in FIG. 12. For example, a user can select an operations tab 1202, select a source tissue 1204 (e.g., enhancing tumor 1112 in FIG. 11), and assign a tumor to a gross tumor volume (GTV) using dropdown 1206. According to one or more embodiments described herein, other options can be provided, such as to expand the selection and add margin, to surround the structure with a desired region of interest, and/or the like including combinations and/or multiples thereof. As shown in FIG. 13, to assign the enhancing tumor to the GTV, the user can select the source 1302 as the enhancing tumor and assign to GTV using the dropdown 1304. As shown in FIG. 14A, to assign the PBZ and GTV to the ROI, the user can select a source as "GTV" and "PBZ" using the operation 1402, assign the source as the clinical target volume (CTV) using the selection box 1404, and apply the assignment using the button 1406. In this way, the CTV includes the GTV and the PBZ. Once the CTV is assigned, the CTV can be reviewed as shown in FIG. 14B, and the user can select the create model button 1408 to initiate creation of the 3D model of the subject.

Figure 15:
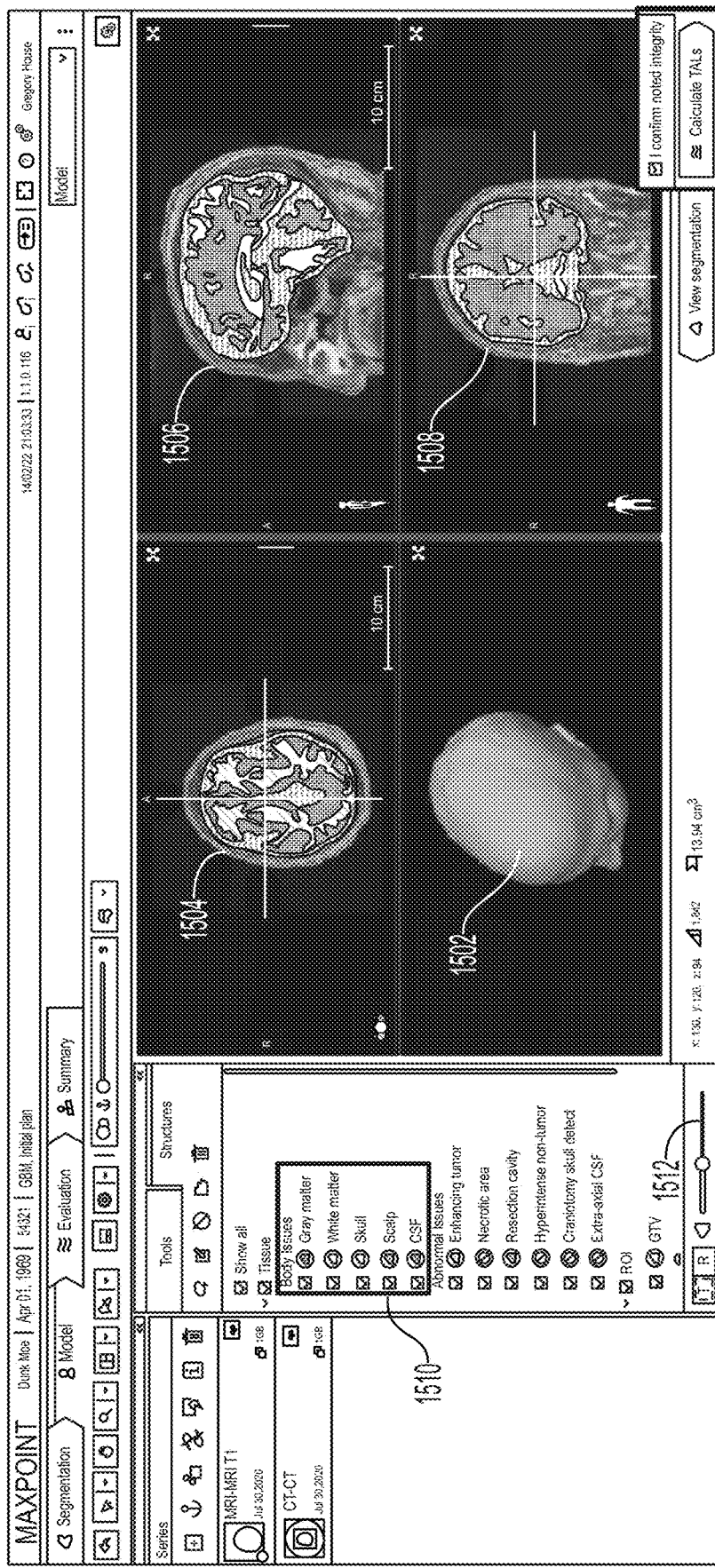

With reference to FIG. 1B, at block 116, the method 100 includes creating the 3D model of the subject based on the anchor medical image, the medical images, and tissue types in the medical images. According to one or more embodiments described herein, the region of interest in the medical image is part of the 3D model. According to one or more embodiments described herein, a three-dimensional conductivity map is part of the 3D model. The three-dimensional conductivity map may indicate the electrical conductivity of the body tissues. Creating the 3D model includes performing calculations to determine conductivity of tissues of the subject based on the anchor medical image, the medical images, and the tissue types in the medical images. For example, creating the 3D model includes assigning tissue types and associated conductivities to voxels of the 3D model of the subject. According to one or more embodiments described herein, creating the 3D model of the subject includes automatically segmenting normal tissue in the medical images. According to one or more embodiments described herein, after the 3D model of the subject is created, the method 100 can include receiving user approval of a three-dimensional conductivity map associated with the 3D model (e.g., block 1118 described below). The interface of FIG. 15 shows an example of a 3D rendering 1502 of a surface view of a subject along with various views 1504, 1506, 1508 (e.g., top view, side view, front view) of the 3D rendering 1502. The rendering 1502 and the views 1504, 1506, 1508 can be generated using the 3D model, for example. According to one or more embodiments described herein, auto-segmented normal tissues, such as gray and white matter, skull, scalp, and cerebrospinal fluid (CSF), can be automatically added to the views 1504, 1506, 1508 of the subject. As shown, these body tissue options can be selectively enabled/disabled using the options 1510. For example, in order to review the 3D model, the body tissues can be selectively enabled/disabled using the options 1510. According to one or more embodiments described herein, colors for different structures can be changed to improve visualization. The opacity for the body tissues can also be changed using the opacity slider 1512. According to one or more embodiments described herein, creating the 3D model of the subject at block 116 can be performed using techniques in commonly-owned U.S. Patent Application Publication No. 2021/0201572, entitled "METHODS, SYSTEMS, AND APPARATUSES FOR IMAGE SEGMENTATION", the contents of which are incorporated herein by reference in its entirety.

At block 118, the method 100 includes receiving a user approval of the 3D model, which may include user approval of the three-dimensional conductivity map associated with the 3D model. For example, with reference to FIG. 15, once the user is satisfied with the three-dimensional conductivity map associated with the 3D rendering 1502, the user can select a button 1514 to calculate one or more transducer array layouts (TALs). Once selected, the computer system begins to calculate in block 120 various transducer array layouts for the subject in order to identify one or more TALs that deliver the desired dose to the clinical target volume.

At block 120, the method 100 includes generating a plurality of transducer array layouts for application of TTFields to the subject based on the 3D model of the subject. The transducer array layouts define the location, relative to the subject, for placing transducer arrays. According to one or more embodiments described herein, the plurality of the transducer layouts includes four locations on the subject to place four respective transducer arrays, such as on a head or torso of the subject. According to one or more embodiments described herein, each of the transducer arrays comprises a plurality of electrode elements. The electrode elements can be any suitable type or material. For example, at least one electrode element can include a ceramic dielectric layer, a polymer film, and/or the like including combinations and/or multiples thereof. Generating the plurality of TALs can be performed after receiving a selection by a user from a user interface to begin the generating. According to one or more embodiments described herein, generating the plurality of transducer array layouts at block 120 can be performed using techniques in commonly owned U.S. Patent Application Publication No. 2021/0201572, entitled "METHODS, SYSTEMS, AND APPARATUSES FOR IMAGE SEGMENTATION", the contents of which are incorporated by reference herein in their entirety.

According to one or more embodiments described herein, during generating the plurality of the transducer layouts, a calculation warning can be provided via a user interface. The calculation warning can indicate at least one of the following: the ROI in the medical images does not contain a minimum number of gray and/or white matter voxels, the ROI in the medical images does not contain a minimum number of enhancing tumor voxels, only regions of interest having gray and/or white matter voxels or enhancing tumor voxels will be presented, and/or the like including combinations and/or multiples thereof. If one or more of these warnings is received, the computer system may provide the user with an opportunity to resolve the problem. For example, to address the warning that the ROI in the medical images does not contain a minimum number of gray and/or white matter voxels is presented, the user may need to revise the size of the ROI so as to include additional gray and/or white matter voxels. For example, to address the warning that the ROI in the medical images does not contain a minimum number of enhancing tumor voxels, the user may need to revise the size of the ROI so as to include additional enhancing tumor voxels. For example, to address the warning that only regions of interest having gray and/or white matter voxels or enhancing tumor voxels will be presented, the user may need to revise the size of the ROI so as that voxels not in the ROI will be presented.

At block 122, the method 100 includes selecting at least two of the transducer array layouts as recommended transducer array layouts for presentation to the user. According to one or more embodiments described herein, at least one of the recommended transducer layouts has a highest dose of tumor treating fields delivered to the ROI, delivered to a tumor progression area, and/or the like including combinations and/or multiples thereof. According to one or more embodiments described herein, at least one of the recommended transducer layouts is a transducer layout that is in a shifted or rotated position compared to a transducer layout having a highest does of tumor treating fields delivered to the ROI. According to one or more embodiments described herein, at least three of the recommended transducer layouts have three highest doses of tumor treating fields delivered to the ROI.

Figure 16:
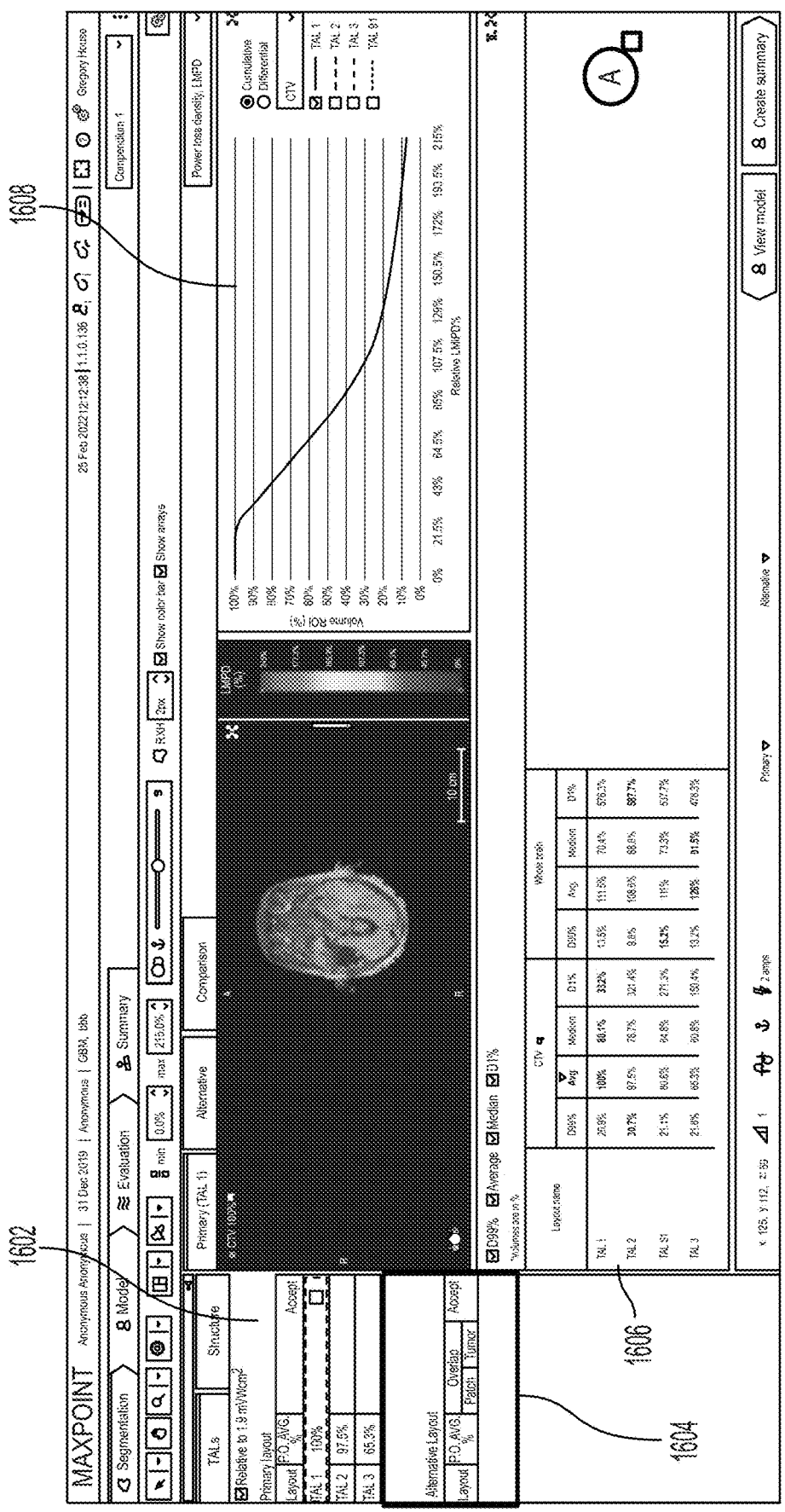

At block 124, the method 100 includes presenting the recommended transducer array layouts. For example, the method 100 can include presenting at least four recommended transducer array layouts, although more or fewer transducer array layouts can be presented in other examples. An example of one of the recommended transducer layouts is shown in FIG. 16, which is described in more detail herein. According to one or more embodiments described herein, presenting the recommended transducer layouts includes presenting information on the recommended transducer layouts via a user interface. The information can include one or more of the following: doses of tumor treating fields delivered to the ROI for each of the recommended transducer layouts, a medical image slice overlaid with a dose of tumor treating fields for at least one recommended transducer layout, a two-dimensional graph comparing percentage volume of ROI and percentage dose of tumor treating fields for at least one recommended transducer layout, an image of the subject depicting locations of electrode elements for at least one recommended transducer layout, a two-dimensional graph depicting a cumulative dose of tumor treating fields across the ROI for at least one recommended transducer layout, a two-dimensional graph depicting a dose of tumor treating fields across the ROI for at least one recommended transducer layout, a percentage of overlap between electrode elements of two recommended transducer layouts, a percentage of overlap between adhesive portions of two recommended transducer layouts, and/or the like including combinations and/or multiples thereof.

Information about one or more of the plurality of recommended transducer array layouts can be presented via the user interface of FIG. 16, for example. In this example, three TALs are shown in the primary layout table 1602 along with a dose distribution for each TAL. Additional TALs can be shown as alternative layouts in other examples. Further information regarding the TALs is shown in the table 1606 and the graph 1608. For example, the table 1606 includes multiple TALs along with CTV and whole brain information. The graph 1608 plots relative local minimum power density (LMiPD) (e.g., a unit of measurement of TTFields dosage) against the volume of the region of interest as a percentage, as shown. In some examples, multiple TALs can be selectively enabled to be shown on the graph 1608 at the same time for comparison purposes.

Figure 17:
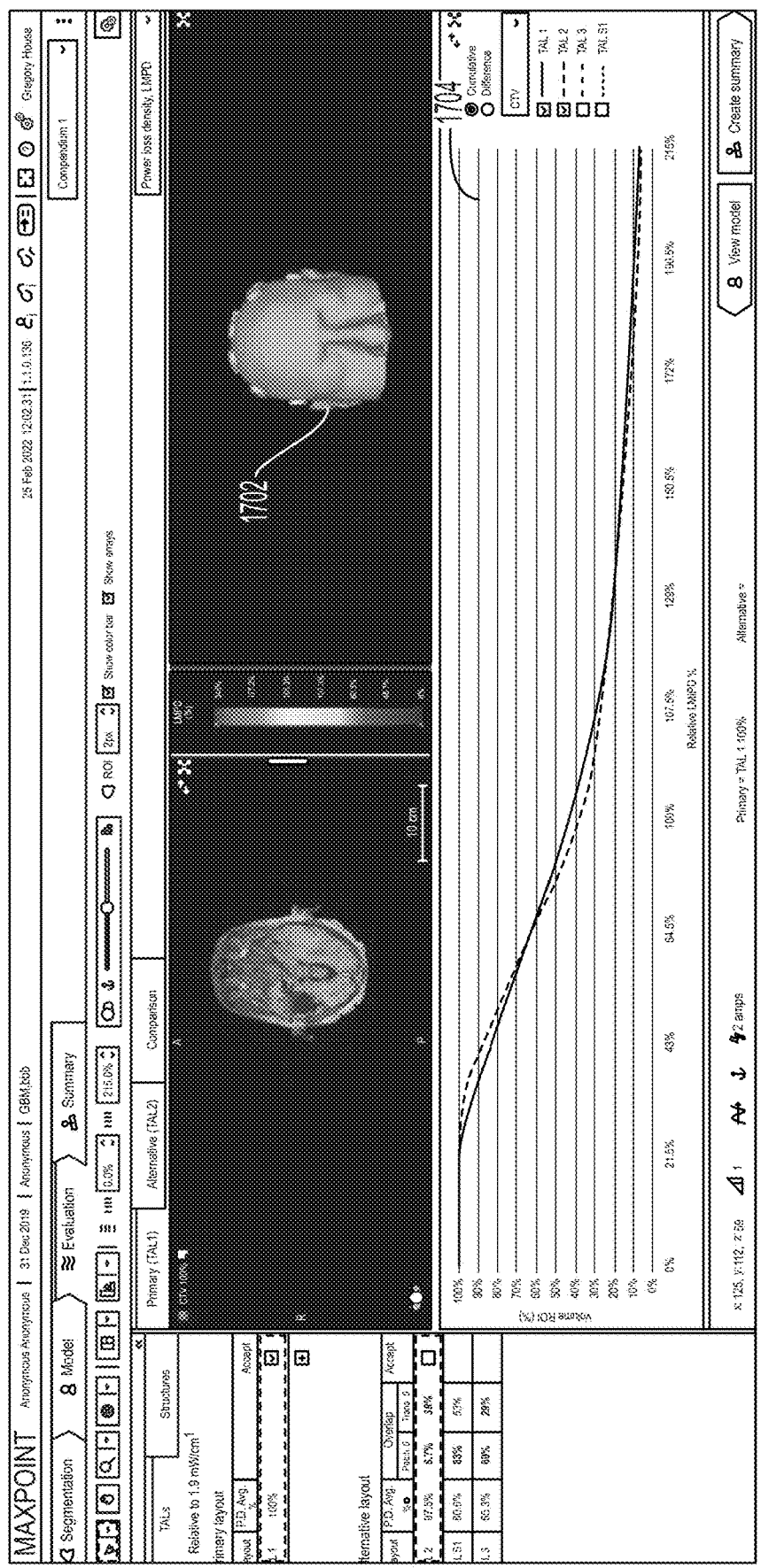
Figure 18:
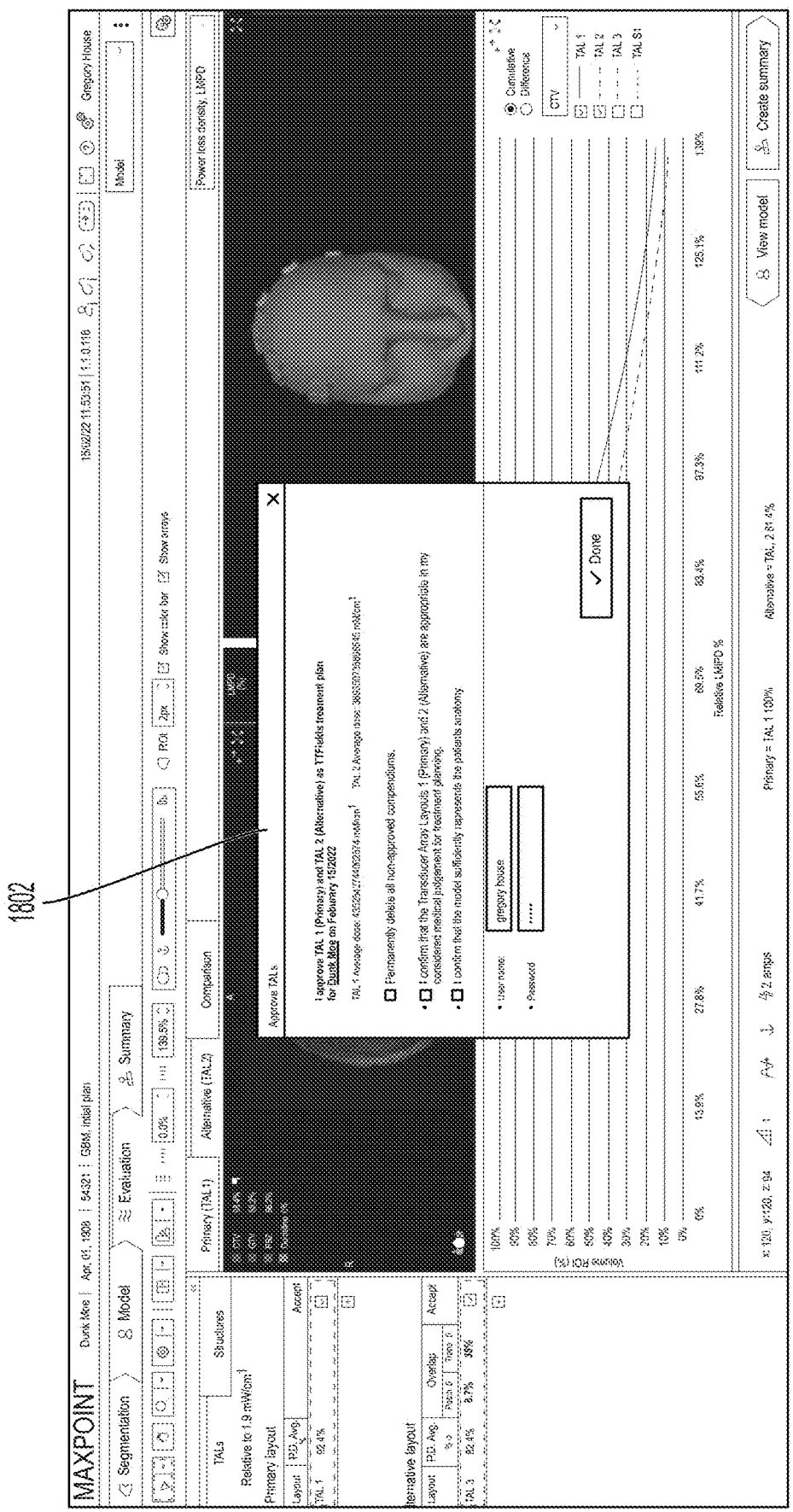

In FIG. 17, another user interface shows one of the recommended TALs situated on a 3D rendering 1702 of a surface view of a subject. The 3D rendering 1702 shows an outer surface of the subject's head with transducer arrays placed on the outer surface of the subject's head. The rendering 1702 can be generated using the 3D model, for example. The interface of FIG. 17 also shows a graph 1704 that plots the relative LMiPD against the volume of the region of interest as a percentage for the two selected TALs.

At block 126, the method 100 includes receiving a user selection of at least one recommended transducer array layout. For example, having two or more transducer array layouts enables a subject to change between or among the transducer array layouts, which can improve the subject's comfort. According to one or more embodiments described herein, the user can select a primary transducer array layout and an alternative transducer array layout. To make the selection, first, the user can accept a primary layout as a first layout. Then, second, the user can review and evaluate alterative layouts and select an alternative layout as a second layout. For example, the user selects one (e.g., a primary) of the TALs for use for a period of time. The user can select another (e.g., an alternate) of the TALs for use after the period of time for another period of time, for example. As shown in the user interface of FIG. 18, the TALs can be approved by entering a username and password in popup window 1802.

Figure 19:
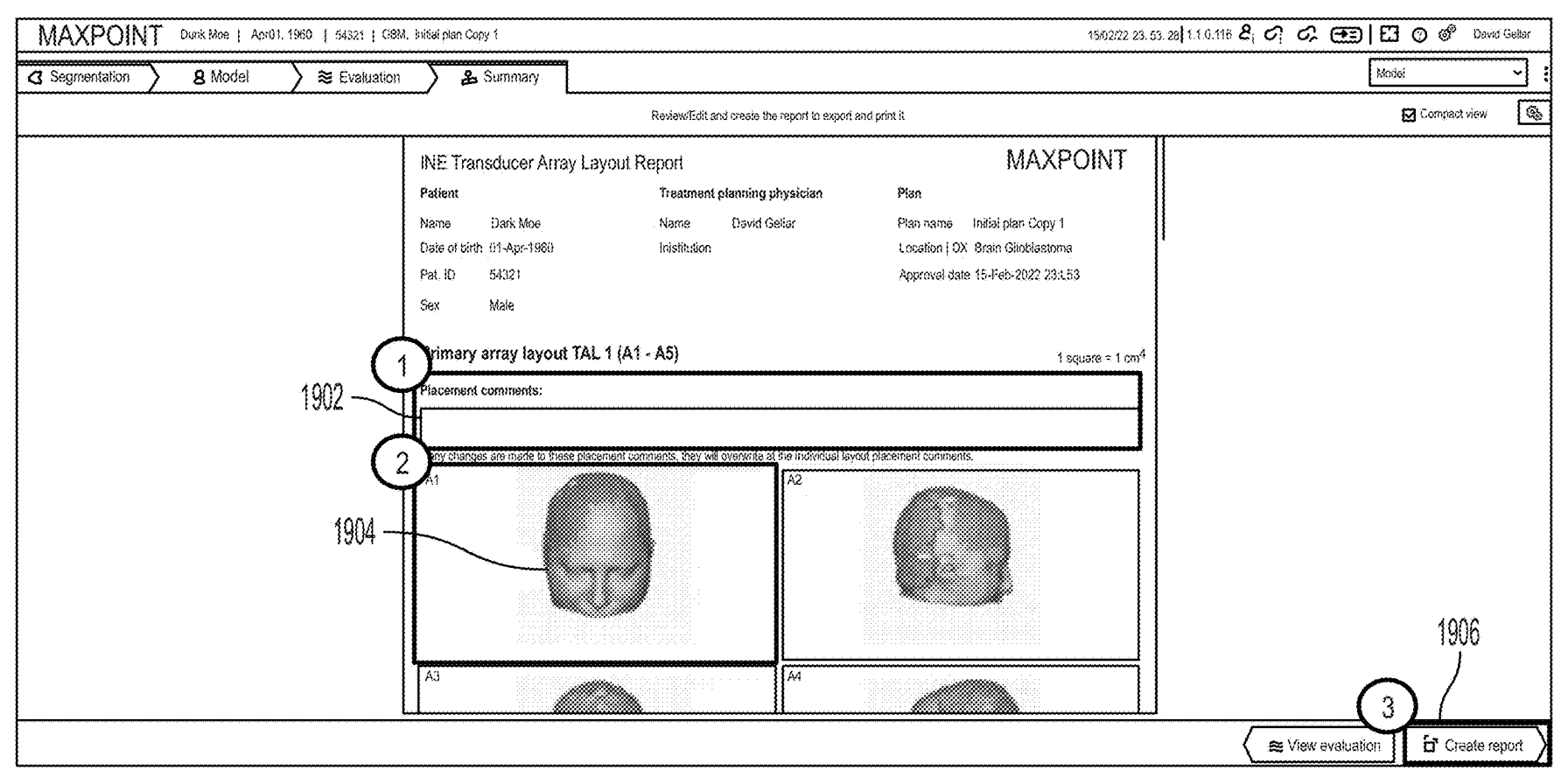
Figure 20:
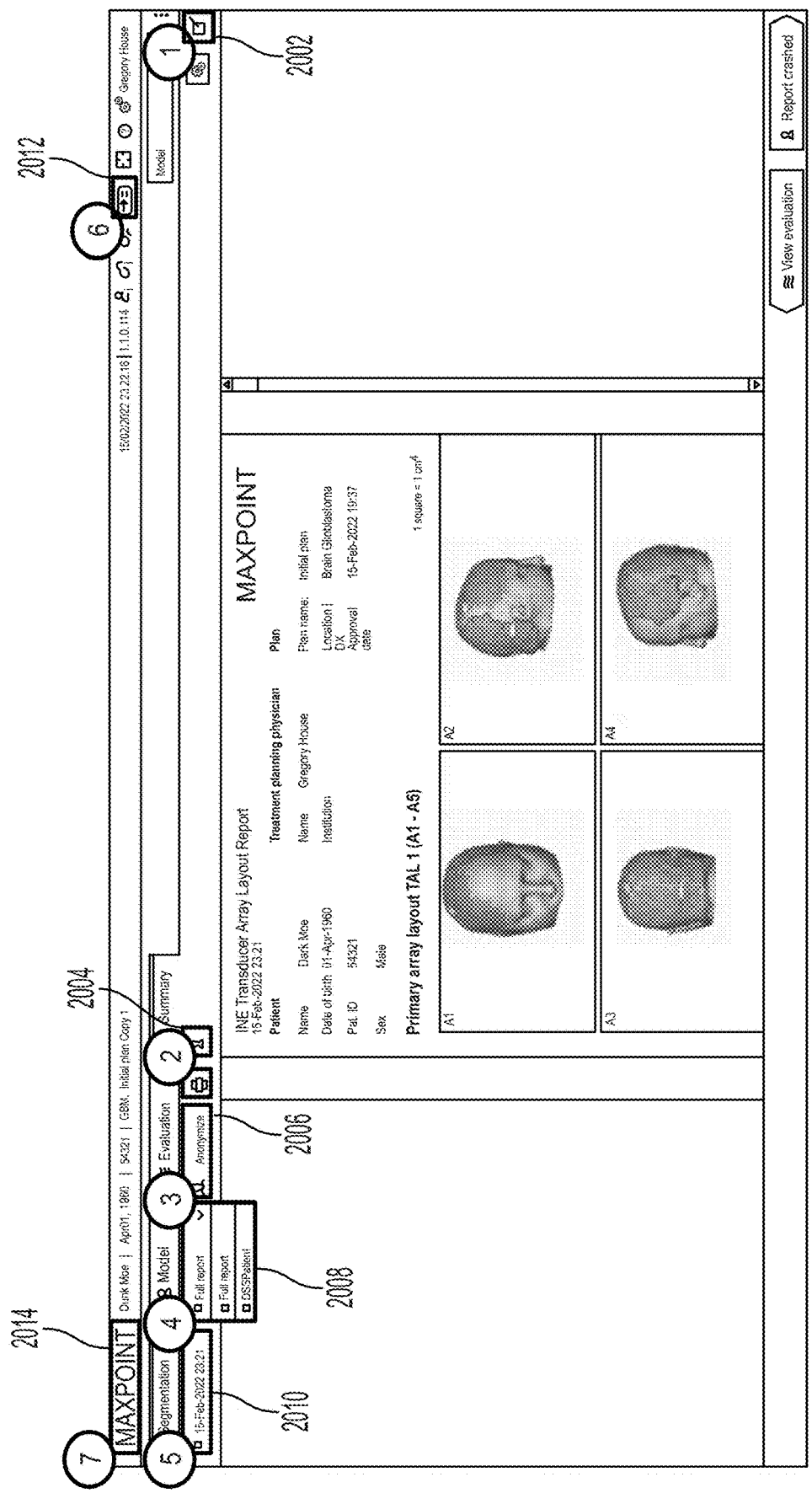
FIG. 20 depicts an example treatment report for a treatment performed using TTFields according to one or more embodiments described herein.

At block 128, the method 100 includes providing a report for the at least one selected recommended transducer layout. According to one or more embodiments described herein, the report can depict locations of transducer arrays of the selected recommended transducer layout on the subject in a plurality of views. According to one or more embodiments described herein, the report can provide dosages of tumor treating fields. It should be appreciated that different reports can be provided, for example, depending on the anticipated target of the report (e.g., a first report type for the subject, a second report type for inclusion in the subject's medical records). FIG. 19 depicts a user interface for creating a report. In this example, comments can be added using text box 1902, 3D head renderings 1904 can be shown and rotated as desired, and the report can be created using the create report button 1906. FIG. 20 depicts a user interface for editing a report. In this example, the user can edit the report using an edit button 2002, can download or print the report using download/print buttons 2004, can anonymize the report using anonymize button 2006, can generate different report types (e.g., full report, patient report, and/or the like including combinations and/or multiples thereof) using the type dropdown 2008, can review different versions of the report using the version dropdown 2010, can return to patient management using the patient management button 2012, and can return to the welcome screen using the return button 2014.

Figure 21:
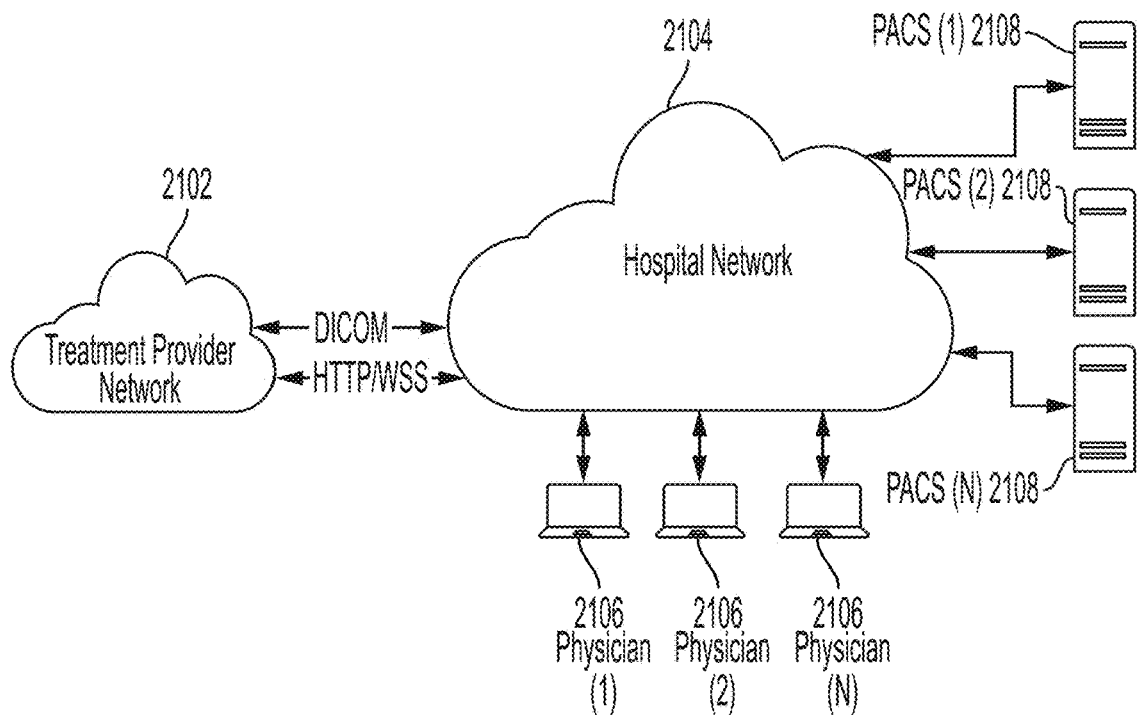
FIG. 21 depicts an example system for treatment planning for TTFields according to one or more embodiments described herein.

FIG. 21 depicts an example system for treatment planning for TTFields according to one or more embodiments described herein. In this example, a treatment provider network 2102 is in direct or indirect communication with a hospital network 2104. The treatment provider network 2102 can implement at least portions of the method 100 of FIGS. 1A and 1B, for example. The hospital network 2104 can facilitate sending and receiving data among different entities, such as the treatment provider network 2102, physicians 2106, and picture archiving and communication systems (PACSs) 2108.

The treatment provider network 2102 can communicate with the hospital network 2104 using secured communications protocols, such as a hypertext transfer protocol (HTTP) secured by a web socket over an encrypted TLS connection (WSS), a digital imaging and communications in medicine (DICOM) protocol, and/or the like including combinations and/or multiples thereof. A physician 2106 can access the hospital network 2104 and can initiate a session for treatment planning for TTFields for a subject using the treatment provider network 2102. The treatment provider network 2102 can access medical images for the subject that may be stored on one or more of the PACSs 2108. Using the medical images, the treatment provider network 2102 can generate a 3D model of the subject and can generate transducer array layouts for application of TTFields for the subject as described herein.

Figure 22:
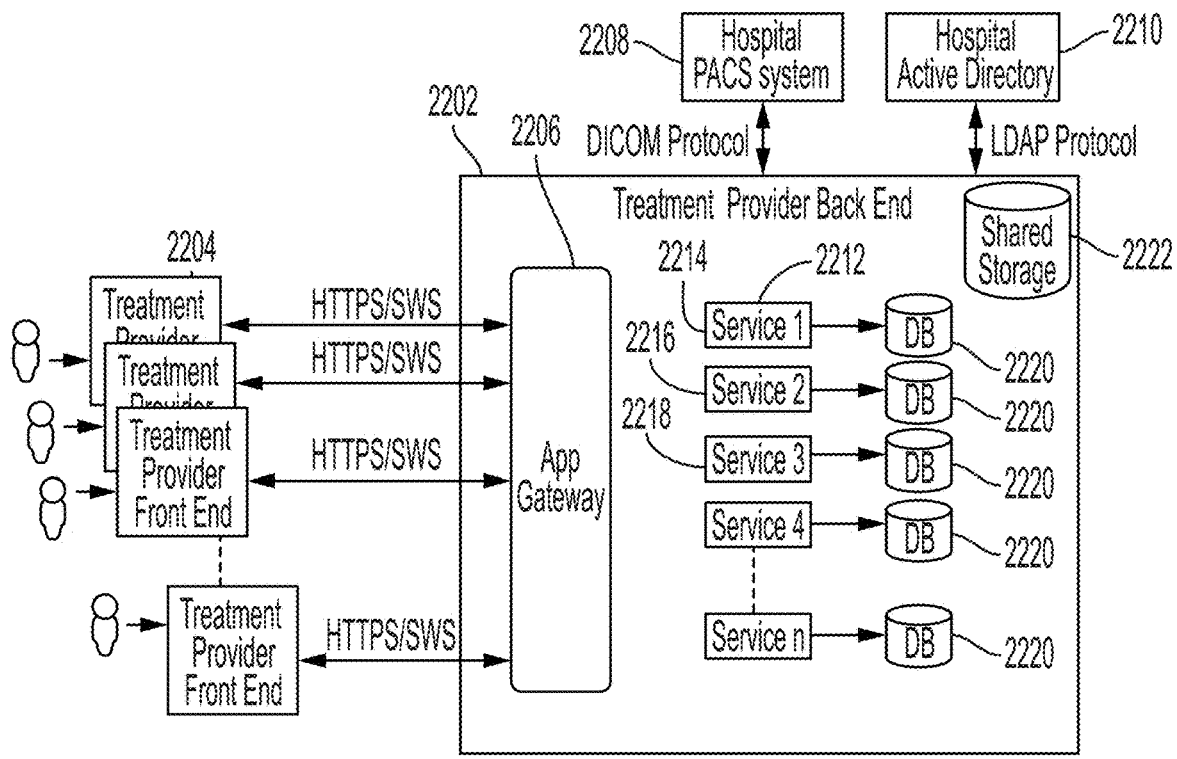
FIG. 22 depicts an example system architecture for treatment planning for TTFields according to one or more embodiments described herein.

FIG. 22 depicts an example system architecture for treatment planning for TTFields according to one or more embodiments described herein. In this example, the treatment provider network 2102 is shown in more detail. The architecture of FIG. 22 includes a treatment provider back end 2202 and a treatment provider front end 2204. The back end 2202 acts as a server for one or more client processing systems (e.g., laptops, smartphones, etc.) that that operate as the front end 2204. The back end 2202 runs in the background and is responsible for back end tasks while the client processing systems use a browser-based user interface that runs the front end tasks, such as handling the user interface, presenting information to the users (e.g., the 3D model, the TALs, and/or the like including combinations and/or multiples thereof), and receiving information from the users (e.g., selection of a TAL, and/or the like).

The back end 2202 and the front end 2204 can communicate via a secured protocol, such as secured HTTP (HTTPS) with secure sockets layer (SSL) web services (SWS). The back end 2202 may use an app gateway 2206 to support and enforce the secure communications between the front end 2204 and the back end 2202.

The back end 2202 also supports communicating with hospital PACS systems 2208, such as via the DICOM protocol. The hospital PACS systems 2208 can provide medical images for subjects. The back end 2202 may further support communicating with a hospital active directory 2210, such as via a lightweight directory access protocol (LDAP) protocol, to provide user authentication services.

The back end 2202 supports one or more services 2212. Services 2212 can include, for example, a cyber-security service 2214, an algorithm service 2216, and a solver service 2218. Other services 2212 can be included in other examples.

The cyber security service 2214 may provide for, for example, user management (e.g., authentication of a user), secured systems communication, user session management, patient information security, and/or the like including combinations and/or multiples thereof.

The algorithm service 2216 may provide for, for example, conversion of DICOM series into system convention format, enhancement of images imported into the back end 2202, registration of a secondary series to an anchor series, segmentation of tissues, defining ROIs, placement of transducer arrays in the 3D model, head avoidance area consideration during the transducer placement, feasibility TAL calculation, analysis of a solver output, statistics information of the LMiPD and local minimum field intensity (LMiFI) values for model regions of interest, and/or the like including combinations and/or multiples thereof.

The solver service 2218 may provide, for example, electrical field calculations based on the 3D tissue segmentation for each TAL in the 3D model, and/or the like including combinations and/or multiples thereof. The information of the segmentation, tissue properties, and transducer array locations may be transferred from the algorithm service 2216 to the solver service 2218, and the solver service 2218 may use this information to provide the electrical field maps for the 3D model. The TAL may be a combination of two separate transducer array channels. The electrical field maps can be used to rank TALs according to the defined regions of interest in the 3D model of the subject.

The back end 2202 can also include various databases 2220 and shared storage 2222 to store data used by the services 2212, 2214, 2216, 2218, including data received from the front end 2204, the hospital PACS systems 2208, and/or the hospital active directory 2210.

Figure 23:
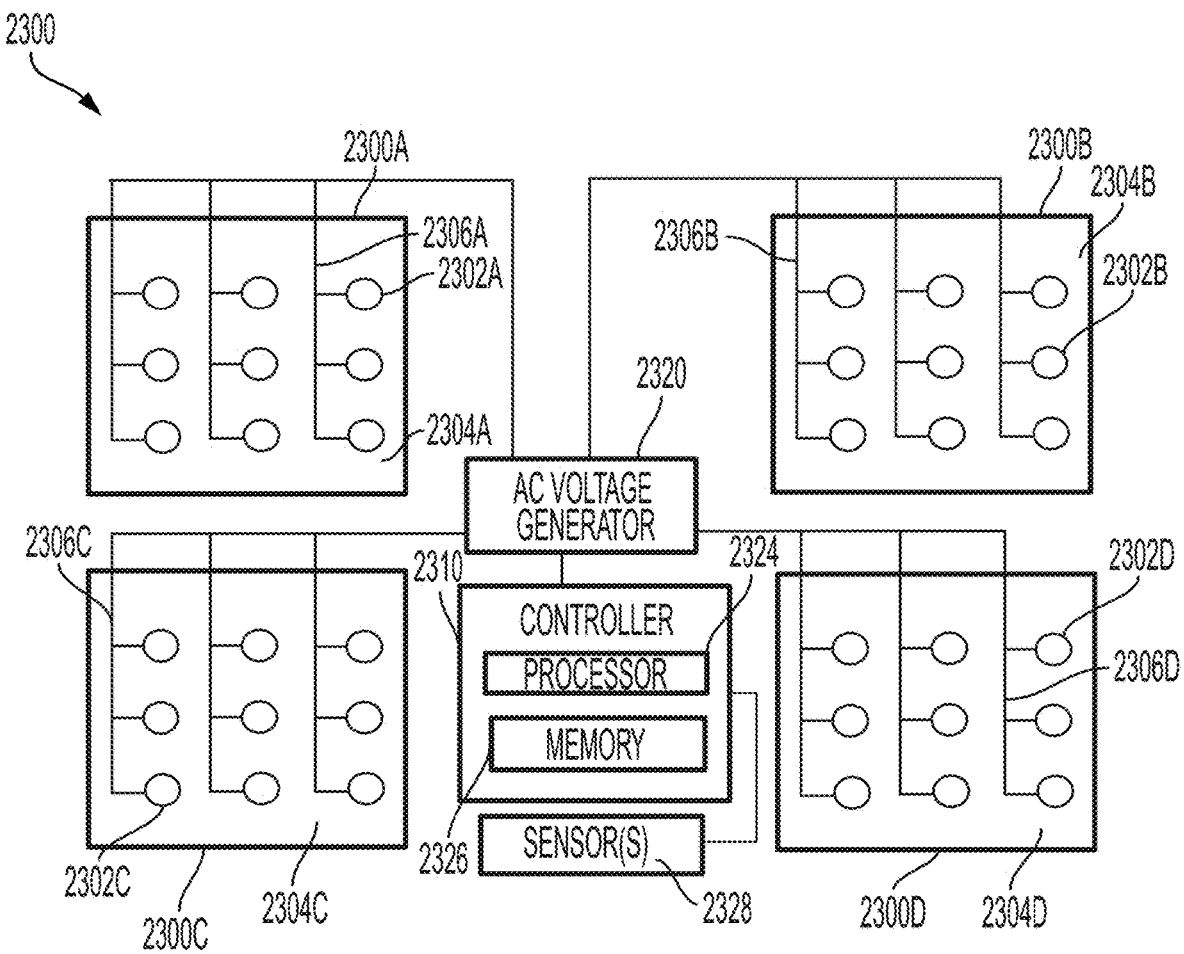
FIG. 23 depicts an example system for delivering TTFields to a subject's body according to one or more embodiments described herein.
Figure 24:
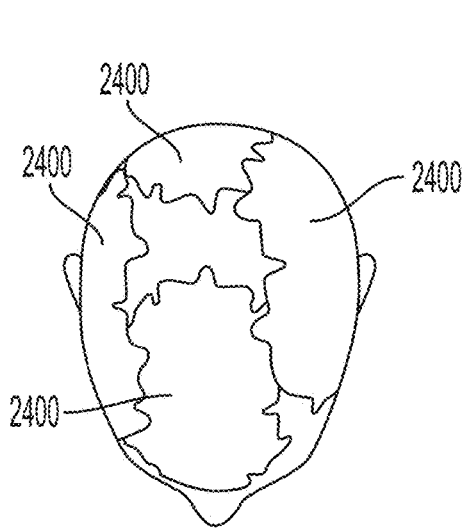
FIG. 24 depicts an example placement of transducers on a subject's head according to one or more embodiments described herein.

FIG. 23 depicts an example apparatus 2300 to apply alternating electric fields (e.g., TTFields) to the subject's body. The system may be used for treating a target region of a subject's body with an alternating electric field. In an example, the target region may be in the subject's brain, and an alternating electric field may be delivered to the subject's body via two pairs of transducer arrays positioned on a head of the subject's body (such as, for example, in FIG. 24, which has four transducers 2400). In another example, the target region may be in the subject's torso, and an alternating electric field may be delivered to the subject's body via two pairs of transducer arrays positioned on at least one of a thorax, an abdomen, or one or both thighs of the subject's body. Other transducer array placements on the subject's body may be possible.

The example apparatus 2300 depicts an example system having four transducers (or "transducer arrays") 2300A-D. Each transducer 2300A-D may include substantially flat electrode elements 2302A-D positioned on a substrate 2304A-D and electrically and physically connected (e.g., through conductive wiring 2306A-D). The substrates 2304A-D may include, for example, cloth, foam, flexible plastic, and/or conductive medical gel. Two transducers (e.g., 2300A and 2300D) may be a first pair of transducers configured to apply an alternating electric field to a target region of the subject's body. The other two transducers (e.g., 2300B and 2300C) may be a second pair of transducers configured to similarly apply an alternating electric field to the target region.

The transducers 2300A-D may be coupled to an AC voltage generator 2320, and the system may further include a controller 2310 communicatively coupled to the AC voltage generator 2320. The controller 2310 may include a computer having one or more processors 2324 and memory 2326 accessible by the one or more processors. The memory 2326 may store instructions that when executed by the one or more processors control the AC voltage generator 2320 to induce alternating electric fields between pairs of the transducers 2300A-D according to one or more voltage waveforms and/or cause the computer to perform one or more methods disclosed herein. The controller 2310 may monitor operations performed by the AC voltage generator 2320 (e.g., via the processor(s) 2324). One or more sensor(s) 2328 may be coupled to the controller 2310 for providing measurement values or other information to the controller.

The electrode elements 2302A-D may be capacitively coupled. In one example, the electrode elements 2302A-D are ceramic electrode elements coupled to each other via conductive wiring 2306A-D. When viewed in a direction perpendicular to its face, the ceramic electrode elements may be circular shaped or non-circular shaped. In other embodiments, the electrode elements are not capacitively coupled, and there is no dielectric material (such as ceramic, or high dielectric polymer layer) associated with the electrode elements.

The structure of the transducers 2300A-D may take many forms. The transducers may be affixed to the subject's body or attached to or incorporated in clothing covering the subject's body. The transducer may include suitable materials for attaching the transducer to the subject's body. For example, the suitable materials may include cloth, foam, flexible plastic, and/or a conductive medical gel. The transducer may be conductive or non-conductive.

The transducer may include any desired number of electrode elements. Various shapes, sizes, and materials may be used for the electrode elements. Any constructions for implementing the transducer (or electric field generating device) for use with embodiments of the invention may be used as long as they are capable of (a) delivering TTFields to the subject's body and (b) being positioned at the locations specified herein. In certain embodiments, at least one electrode element of the first, the second, the third, or the fourth transducer can include at least one ceramic disk that is adapted to generate an alternating electric field. In non-limiting embodiments, at least one electrode element of the first, the second, the third, or the fourth transducer includes a polymer film that is adapted to generate an alternating field.

Figure 25:
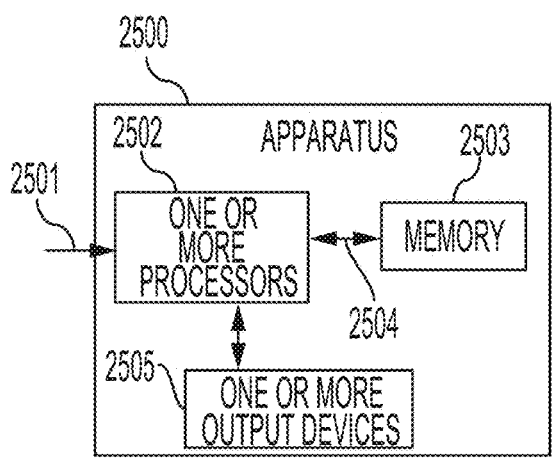
FIG. 25 depicts an example apparatus for performing the disclosed methods according to one or more embodiments described herein.

FIG. 25 depicts an example computer apparatus for use with the embodiments herein. As an example, the apparatus 2500 may be a computer to implement certain inventive techniques disclosed herein, such as selecting transducer locations for delivering TTFields to a subject. For example, blocks 102-128 of FIGS. 1A and 1B may be performed by a computer, such as the apparatus 2500. As an example, the apparatus 2500 may be a controller apparatus to apply the alternating electric fields (e.g., TTFields) with modulated electric fields for the embodiments herein. The apparatus 2500 may be used as the controller 2310 of FIG. 23. The apparatus 2500 may include one or more processors 2502, memory 2503, one or more input devices, and one or more output devices 2505.

In one example, based on input 2501, the one or more processors 2502 may generate control signals to control the voltage generator to implement an embodiment of the present disclosure. In one example, the input 2501 is user input. In another example, the input 2501 may be from another computer in communication with the apparatus 2500. The input 2501 may be received in conjunction with one or more input devices (not shown) of the apparatus 2500.

The memory 2503 may be accessible by the one or more processors 2502 (e.g., via a link) so that the one or more processors 2502 can read information from and write information to the memory 2503. The memory 2503 may store instructions that when executed by the one or more processors 2502 implement one or more embodiments of the present disclosure.

The one or more output devices 2505 may provide the status of the operation of the invention, such as transducer array selection, voltages being generated, and other operational information. The output device(s) 2505 may provide visualization data according to certain embodiments of the invention.

The apparatus 2500 may be an apparatus for generating at least one transducer layout for delivering tumor treating fields to a subject, the apparatus including: one or more processors (such as one or more processors 2502); and memory (such as memory 2503) accessible by the one or more processors, the memory storing instructions that when executed by the one or more processors, cause the apparatus to perform one or more methods described herein.

The memory 2503 may be a non-transitory processor readable medium containing a set of instructions thereon for generating at least one transducer layout for delivering tumor treating fields to a subject, wherein when executed by a processor (such as processor 2502), the instructions cause the processor to perform one or more methods described herein.

ILLUSTRATIVE EMBODIMENTS

The invention includes other illustrative embodiments ("Embodiments") as follows.

Embodiment 1. A computer-implemented method for generating at least one transducer layout for delivering tumor treating fields to a subject, the method comprising: storing in memory a plurality of medical images of a subject, the medical images comprising magnetic resonance imaging (MRI) medical images and computed tomography (CT) medical images, the medical images comprising voxels; identifying one of the medical images as an anchor medical image, the anchor medical image being used to fix the medical images for creating a three-dimensional model of the subject; registering the CT medical images with the MRI medical images; segmenting abnormal tissue in the medical images from other tissue types in the medical images; defining a region of interest (ROI) in the medical images for application of tumor treating fields to the subject; creating the three-dimensional model of the subject based on the anchor medical image, the medical images, and tissue types in the medical images, wherein the region of interest in the medical images is part of the three-dimensional model; generating a plurality of transducer layouts for application of tumor treating fields to the subject based on the three-dimensional model of the subject; selecting at least two of the transducer layouts as recommended transducer layouts; presenting the recommended transducer layouts; receiving a user selection of at least one recommended transducer layout; and providing a report for the at least one selected recommended transducer layout.

Embodiment 1A: The computer-implemented method of Embodiment 1, wherein the anchor medical image is a T1 contrast MRI slice.

Embodiment 2: The computer-implemented method of Embodiment 1, wherein after the CT medical images are registered with the MRI medical images, the CT medical images are aligned and linked with the MRI medical images.

Embodiment 2A: The computer-implemented method of Embodiment 1, wherein registering the CT medical images with the MRI medical images comprises aligning and linking the CT medical images and the MRI medical images.

Embodiment 2B: The computer-implemented method of Embodiment 1, wherein registering the CT medical images with the MRI medical images is performed automatically upon receiving a user request.

Embodiment 3: The computer-implemented method of Embodiment 1, wherein segmenting the abnormal tissue is based on user input identifying abnormal tissue in the medical images.

Embodiment 4: The computer-implemented method of Embodiment 1, further comprising storing in memory a radiation therapy segmentation of the medical images, wherein segmenting the abnormal tissue is based on the radiation therapy segmentation Embodiment 5: The computer-implemented method of Embodiment 1, wherein the abnormal tissue includes at least one of tumor, necrotic tissue, or prior surgical area.

Embodiment 5A: The computer-implemented method of Embodiment 5, wherein the prior surgical area is a resection cavity.

Embodiment 6: The computer-implemented method of Embodiment 1, wherein defining the ROI in the medical images comprises defining a gross tumor volume (GTV) and a clinical target volume (CTV) in the medical images.

Embodiment 7: The computer-implemented method of Embodiment 1, wherein defining the ROI in the medical images comprises defining a proximal boundary zone (PBZ) in the medical images.

Embodiment 7A: The computer-implemented method of Embodiment 1, wherein defining the ROI in the medical images comprises adding a margin of approximately 3 mm to expand the ROI.

Embodiment 8: The computer-implemented method of claim 1, wherein defining the ROI in the medical images comprises defining a gross tumor volume (GTV) and a proximal boundary zone (PBZ) in the medical images and defining a clinical target volume (CTV) in the medical images by combining the GTV and PBZ.

Embodiment 9: The computer-implemented method of claim 1, wherein creating the three-dimensional model of the subject comprises assigning tissue types and associated conductivities to voxels of the three-dimensional model of the subject.

Embodiment 9A: The computer-implemented method of claim 1, wherein creating the three-dimensional model of the subject comprises automatically segmenting normal tissue in the medical images.

Embodiment 9B: The computer-implemented method of claim 1, further comprising after the three-dimensional model of the subject is created, receiving user approval of a three-dimensional conductivity map associated with the three-dimensional model.

Embodiment 10: The computer-implemented method of Embodiment 1, wherein the plurality of the transducer layouts includes four locations on the subject to place four respective transducer arrays.

Embodiment 11: The computer-implemented method of Embodiment 10, wherein each of the transducer arrays comprises a plurality of electrode elements, wherein at least one electrode element comprises a ceramic dielectric layer.

Embodiment 12: The computer-implemented method of Embodiment 10, wherein each of the transducer arrays comprises a plurality of electrode elements, wherein at least one electrode element comprises a polymer film.

Embodiment 12A: The computer-implemented method of Embodiment 10, wherein the four locations on the subject are on the head of the subject.

Embodiment 12B: The computer-implemented method of Embodiment 10, wherein the four locations on the subject are on the torso of the subject.

Embodiment 12C: The computer-implemented method of Embodiment 1, wherein generating the plurality of the transducer layouts begins after receiving a selection by a user from a user interface to begin the generating.

Embodiment 13: The computer-implemented method of Embodiment 1, wherein during generating the plurality of the transducer layouts, providing a calculation warning via a user interface, wherein the calculation warning indicates at least one of: the ROI in the medical images does not contain a minimum number of gray and/or white matter voxels; the ROI in the medical images does not contain a minimum number of enhancing tumor voxels; or only regions of interest having gray and/or white matter voxels or enhancing tumor voxels will be presented.

Embodiment 14: The computer-implemented method of Embodiment 1, wherein at least one of the recommended transducer layouts has a highest dose of tumor treating fields delivered to the ROI.

Embodiment 15: The computer-implemented method of Embodiment 1, wherein at least one of the recommended transducer layouts is a transducer layout that is in a shifted or rotated position compared to a transducer layout having a highest does of tumor treating fields delivered to the ROI.

Embodiment 15A: The computer-implemented method of Embodiment 1, wherein at least one of the recommended transducer layouts has a highest dose of tumor treating fields delivered a tumor progression area.

Embodiment 15B: The computer-implemented method of Embodiment 1, wherein at least three of the recommended transducer layouts have three highest doses of tumor treating fields delivered to the ROI.

Embodiment 16: The computer-implemented method of Embodiment 1, wherein wherein presenting the recommended transducer layouts comprises presenting information on the recommended transducer layouts via a user interface, wherein the information is presented as at least one of: doses of tumor treating fields delivered to the ROI for each of the recommended transducer layouts; a medical image slice overlaid with a dose of tumor treating fields for at least one recommended transducer layout; a two-dimensional graph comparing percentage volume of ROI and percentage dose of tumor treating fields for at least one recommended transducer layout; an image of the subject depicting locations of electrode elements for at least one recommended transducer layout; a two-dimensional graph depicting a cumulative dose of tumor treating fields across the ROI for at least one recommended transducer layout; a two-dimensional graph depicting a dose of tumor treating fields across the ROI for at least one recommended transducer layout; a percentage of overlap between electrode elements of two recommended transducer layouts; or a percentage of overlap between adhesive portions of two recommended transducer layouts.

Embodiment 16A: The computer-implemented method of Embodiment 1, wherein presenting the recommended transducer layouts comprises presenting at least four recommended transducer layouts.

Embodiment 17: The computer-implemented method of Embodiment 1, wherein receiving a user selection of at least one recommended transducer layout comprises receiving a selection of a primary transducer layout and an alternative transducer layout.

Embodiment 18: The computer-implemented method of Embodiment 1, wherein the report for at least one selected recommended transducer layout displays locations of transducer arrays of the selected recommended transducer layout on the subject in a plurality of views.

Embodiment 18A: The computer-implemented method of Embodiment 1, wherein the report for at least one selected recommended transducer layout provides dosages of tumor treating fields.

Embodiment 19: An apparatus for generating at least one transducer layout for delivering tumor treating fields to a subject, the apparatus comprising: one or more processors; and memory accessible by the one or more processors, the memory storing instructions that when executed by the one or more processors, cause the apparatus to: store in memory a plurality of medical images of a subject, the medical images comprising magnetic resonance imaging (MRI) medical images and computed tomography (CT) medical images, the medical images comprising voxels; identify one of the medical images as an anchor medical image, the anchor medical image being used to fix the medical images for creating a three-dimensional model of the subject; register the CT medical images with the MRI medical images; segment abnormal tissue in the medical images from other tissue types in the medical images; define a region of interest (ROI) in the medical images for application of tumor treating fields to the subject; create the three-dimensional model of the subject based on the anchor medical image, the medical images, and tissue types in the medical images, wherein the region of interest in the medical images is part of the three-dimensional model; generate a plurality of transducer layouts for application of tumor treating fields to the subject based on the three-dimensional model of the subject; select at least two of the transducer layouts as recommended transducer layouts; present the recommended transducer layouts; receive a user selection of at least one recommended transducer layout; and provide a report for the at least one selected recommended transducer layout.

Embodiment 20: A non-transitory processor readable medium containing a set of instructions thereon for generating at least one transducer layout for delivering tumor treating fields to a subject, wherein when executed by a processor, the instructions cause the processor to: store in memory a plurality of medical images of a subject, the medical images comprising magnetic resonance imaging (MRI) medical images and computed tomography (CT) medical images, the medical images comprising voxels; identify one of the medical images as an anchor medical image, the anchor medical image being used to fix the medical images for creating a three-dimensional model of the subject; register the CT medical images with the MRI medical images; segment abnormal tissue in the medical images from other tissue types in the medical images; define a region of interest (ROI) in the medical images for application of tumor treating fields to the subject; create the three-dimensional model of the subject based on the anchor medical image, the medical images, and tissue types in the medical images, wherein the region of interest in the medical images is part of the three-dimensional model; generate a plurality of transducer layouts for application of tumor treating fields to the subject based on the three-dimensional model of the subject; select at least two of the transducer layouts as recommended transducer layouts; present the recommended transducer layouts; receive a user selection of at least one recommended transducer layout; and provide a report for the at least one selected recommended transducer layout.

Optionally, for each embodiment described herein, the voltage generation components supply the transducers with an electrical signal having an alternating current waveform at frequencies in a range from about 50 kHz to about 1 MHz and appropriate to deliver TTFields treatment to the subject's body.

Embodiments illustrated under any heading or in any portion of the disclosure may be combined with embodiments illustrated under the same or any other heading or other portion of the disclosure unless otherwise indicated herein or otherwise clearly contradicted by context. For example, and without limitation, embodiments described in dependent claim format for a given embodiment (e.g., the given embodiment described in independent claim format) may be combined with other embodiments (described in independent claim format or dependent claim format).

Numerous modifications, alterations, and changes to the described embodiments are possible without departing from the scope of the present invention defined in the claims. It is intended that the present invention not be limited to the described embodiments, but that it has the full scope defined by the language of the following claims, and equivalents thereof.

What is claimed is:
1. A computer-implemented method for generating at least one transducer layout for delivering tumor treating fields to a subject, the method comprising:
storing in memory a plurality of medical images of a subject, the medical images comprising magnetic resonance imaging (MRI) medical images and computed tomography (CT) medical images, the medical images comprising voxels;
identifying one of the medical images as an anchor medical image, the anchor medical image being used to fix the medical images for creating a three-dimensional model of the subject;
registering the CT medical images with the MRI medical images;
segmenting abnormal tissue in the medical images from other tissue types in the medical images;
defining a region of interest (ROI) in the medical images for application of tumor treating fields to the subject;
creating the three-dimensional model of the subject based on the anchor medical image, the medical images, and tissue types in the medical images, wherein the ROI in the medical images is part of the three-dimensional model;
receiving an adjustment to the ROI to address a calculation warning provided via a user interface;

generating a plurality of transducer layouts for application of tumor treating fields to the subject based on the three-dimensional model of the subject;
selecting at least two of the transducer layouts as recommended transducer layouts;
presenting the recommended transducer layouts;
receiving a user selection of at least one recommended transducer layout; and
providing a report for the at least one selected recommended transducer layout,
wherein the calculation warning indicates at least one of:
the ROI in the medical images does not contain a minimum number of gray and/or white matter voxels;
the ROI in the medical images does not contain a minimum number of enhancing tumor voxels; or
only regions of interest having gray and/or white matter voxels or enhancing tumor voxels will be presented.

2. The method of claim 1, wherein after the CT medical images are registered with the MRI medical images, the CT medical images are aligned and linked with the MRI medical images.

3. The method of claim 1, wherein segmenting the abnormal tissue is based on user input identifying abnormal tissue in the medical images.

4. The method of claim 1, further comprising storing in memory a radiation therapy segmentation of the medical images,
wherein segmenting the abnormal tissue is based on the radiation therapy segmentation.

5. The method of claim 1, wherein the abnormal tissue includes at least one of tumor, necrotic tissue, or prior surgical area.

6. The method of claim 1, wherein defining the ROI in the medical images comprises defining a gross tumor volume (GTV) and a clinical target volume (CTV) in the medical images.

7. The method of claim 1, wherein defining the ROI in the medical images comprises defining a proximal boundary zone (PBZ) in the medical images.

8. The method of claim 1, wherein defining the ROI in the medical images comprises defining a gross tumor volume (GTV) and a proximal boundary zone (PBZ) in the medical images and defining a clinical target volume (CTV) in the medical images by combining the GTV and PBZ.

9. The method of claim 1, wherein creating the three-dimensional model of the subject comprises assigning tissue types and associated conductivities to voxels of the three-dimensional model of the subject.

10. The method of claim 1, wherein the plurality of the transducer layouts includes four locations on the subject to place four respective transducer arrays.

11. The method of claim 10, wherein each of the transducer arrays comprises a plurality of electrode elements, wherein at least one electrode element comprises a ceramic dielectric layer.

12. The method of claim 10, wherein each of the transducer arrays comprises a plurality of electrode elements, wherein at least one electrode element comprises a polymer film.

13. The method of claim 1, wherein at least one of the recommended transducer layouts has a highest dose of tumor treating fields delivered to the ROI.

14. The method of claim 1, wherein at least one of the recommended transducer layouts is a transducer layout that is in a shifted or rotated position compared to a transducer layout having a highest dose of tumor treating fields delivered to the ROI.

15. The method of claim 1, wherein presenting the recommended transducer layouts comprises presenting information on the recommended transducer layouts via a user interface, wherein the information is presented as at least one of:
doses of tumor treating fields delivered to the ROI for each of the recommended transducer layouts;
a medical image slice overlaid with a dose of tumor treating fields for at least one recommended transducer layout;
a two-dimensional graph comparing percentage volume of ROI and percentage dose of tumor treating fields for at least one recommended transducer layout;
an image of the subject depicting locations of electrode elements for at least one recommended transducer layout;
a two-dimensional graph depicting a cumulative dose of tumor treating fields across the ROI for at least one recommended transducer layout;
a two-dimensional graph depicting a dose of tumor treating fields across the ROI for at least one recommended transducer layout;
a percentage of overlap between electrode elements of two recommended transducer layouts; or
a percentage of overlap between adhesive portions of two recommended transducer layouts.

16. The method of claim 1, wherein receiving a user selection of at least one recommended transducer layout comprises receiving a selection of a primary transducer layout and an alternative transducer layout.

17. The method of claim 1, wherein the report for at least one selected recommended transducer layout displays locations of transducer arrays of the selected recommended transducer layout on the subject in a plurality of views.

18. The method of claim 1, wherein during generating the plurality of the transducer layouts, the method further comprises:
determining whether the ROI in the medical images contains the minimum number of gray and/or white matter voxels;
determining whether the ROI in the medical images contains the minimum number of enhancing tumor voxels; and
determining whether only regions of interest having gray and/or white matter voxels or enhancing tumor voxels will be presented.

19. The method of claim 18, wherein if the calculation warning indicates that the ROI in the medical images does not contain a minimum number of gray and/or white matter voxels, receiving a revision of the ROI in the medical images to include additional gray and/or white matter voxels,
wherein if the calculation warning indicates that the ROI in the medical images does not contain a minimum number of enhancing tumor voxels, receiving a revision of the ROI in the medical images to include additional enhancing tumor voxels, and
wherein if the calculation warning indicates that only regions of interest having gray and/or white matter voxels or enhancing tumor voxels will be presented, receiving a revision of a size of the ROI in the medical images so voxels not in the ROI will be presented.

20. An apparatus for generating at least one transducer layout for delivering tumor treating fields to a subject, the apparatus comprising: one or more processors; and
memory accessible by the one or more processors, the memory storing instructions that when executed by the one or more processors, cause the apparatus to:
store in memory a plurality of medical images of a subject, the medical images comprising magnetic resonance imaging (MRI) medical images and computed tomography (CT) medical images, the medical images comprising voxels;
identify one of the medical images as an anchor medical image, the anchor medical image being used to fix the medical images for creating a three-dimensional model of the subject;
register the CT medical images with the MRI medical images;
segment abnormal tissue in the medical images from other tissue types in the medical images;
define a region of interest (ROI) in the medical images for application of tumor treating fields to the subject;
create the three-dimensional model of the subject based on the anchor medical image, the medical images, and tissue types in the medical images, wherein the region of interest in the medical images is part of the three-dimensional model;
receive an adjustment to the ROI to address a calculation warning provided via a user interface;
generate a plurality of transducer layouts for application of tumor treating fields to the subject based on the three-dimensional model of the subject;
select at least two of the transducer layouts as recommended transducer layouts;
present the recommended transducer layouts;
receive a user selection of at least one recommended transducer layout; and
provide a report for the at least one selected recommended transducer layout,
wherein the calculation warning indicates at least one of:
the ROI in the medical images does not contain a minimum number of gray and/or white matter voxels;
the ROI in the medical images does not contain a minimum number of enhancing tumor voxels; or
only regions of interest having gray and/or white matter voxels or enhancing tumor voxels will be presented.

21. A non-transitory processor readable medium containing a set of instructions thereon for generating at least one transducer layout for delivering tumor treating fields to a subject, wherein when executed by a processor, the instructions cause the processor to: store in memory a plurality of medical images of a subject, the medical images comprising magnetic resonance imaging (MRI) medical images and computed tomography (CT) medical images, the medical images comprising voxels;
identify one of the medical images as an anchor medical image, the anchor medical image being used to fix the medical images for creating a three-dimensional model of the subject;
register the CT medical images with the MRI medical images;
segment abnormal tissue in the medical images from other tissue types in the medical images;
define a region of interest (ROI) in the medical images for application of tumor treating fields to the subject;
create the three-dimensional model of the subject based on the anchor medical image, the medical images, and tissue types in the medical images, wherein the region of interest in the medical images is part of the three-dimensional model;
receive an adjustment to the ROI to address a calculation warning provided via a user interface;
generate a plurality of transducer layouts for application of tumor treating fields to the subject based on the three-dimensional model of the subject;
select at least two of the transducer layouts as recommended transducer layouts;
present the recommended transducer layouts;
receive a user selection of at least one recommended transducer layout; and
provide a report for the at least one selected recommended transducer layout,
wherein the calculation warning indicates at least one of:
the ROI in the medical images does not contain a minimum number of gray and/or white matter voxels;
the ROI in the medical images does not contain a minimum number of enhancing tumor voxels; or
only regions of interest having gray and/or white matter voxels or enhancing tumor voxels will be presented.

* * * * *